United States Patent
Li et al.

(10) Patent No.: US 10,425,824 B2
(45) Date of Patent: **\*Sep. 24, 2019**

(54) HYBRID INDICATION SCHEME FOR ENHANCED MOBILE BROADBAND AND LOW LATENCY COMMUNICATION MULTIPLEXING

(71) Applicant: QUALCOMM Incorporated, San Diego, CA (US)

(72) Inventors: Chong Li, Weehawken, NJ (US); Alexandros Manolakos, San Diego, CA (US); SeyedKianoush Hosseini, San Diego, CA (US); Jing Jiang, San Diego, CA (US)

(73) Assignee: QUALCOMM Incorporated, San Diego, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 15/870,556

(22) Filed: Jan. 12, 2018

(65) Prior Publication Data

US 2018/0234853 A1     Aug. 16, 2018

Related U.S. Application Data

(60) Provisional application No. 62/458,547, filed on Feb. 13, 2017.

(51) Int. Cl.
*H04W 16/06* (2009.01)
*H04W 16/10* (2009.01)
(Continued)

(52) U.S. Cl.
CPC ........... *H04W 16/06* (2013.01); *H04L 5/0007* (2013.01); *H04L 5/0053* (2013.01);
(Continued)

(58) Field of Classification Search
CPC . H04W 16/06; H04W 16/10; H04W 72/0446; H04W 72/042; H04W 72/048; H04L 5/0082

See application file for complete search history.

(56) References Cited

U.S. PATENT DOCUMENTS

| 7,184,485 B2 * | 2/2007 | Balakrishnan ......... H04B 1/719 370/208 |
| 8,780,833 B2 * | 7/2014 | Kim ........................ H04L 5/001 370/329 |

(Continued)

OTHER PUBLICATIONS

International Search Report and Written Opinion—PCT/US2018/013944—ISA/EPO—dated May 18, 2018.
(Continued)

*Primary Examiner* — Jianye Wu
(74) *Attorney, Agent, or Firm* — Holland & Hart LLP

(57) ABSTRACT

Methods, systems, and devices for wireless communication are described. Some wireless communications systems support mobile broadband (MBB) communications and low latency communications. To accommodate low latency communications, a base station may identify resources allocated for MBB communications, and the base station may reassign (or puncture) these resources for low latency communications. The base station may transmit an indication of the reassigned (or punctured) resources to one or more user equipments (UEs). The base station may transmit an indication of the reassigned resources over a designated indication channel during a time period that is being reassigned for low latency communications (e.g., using a current indication). The base station may also transmit another or complementary indication of the reassigned resources in a subsequent time period (e.g., using a post indication), which may include supplemental or additional information.

27 Claims, 16 Drawing Sheets

(51) Int. Cl.
*H04W 72/04* (2009.01)
*H04L 5/00* (2006.01)

(52) U.S. Cl.
CPC .......... *H04L 5/0091* (2013.01); *H04L 5/0094* (2013.01); *H04W 16/10* (2013.01); *H04W 72/042* (2013.01); *H04W 72/048* (2013.01); *H04L 5/0082* (2013.01); *H04W 72/0446* (2013.01)

(56) References Cited

U.S. PATENT DOCUMENTS

| | | | | |
|---|---|---|---|---|
| 9,538,503 | B2* | 1/2017 | Papasakellariou | H04W 72/04 |
| 9,629,143 | B2* | 4/2017 | Jung | H04W 72/042 |
| 2014/0241308 | A1* | 8/2014 | Hoffmann | H04W 72/0446 370/330 |
| 2016/0211867 | A1* | 7/2016 | Guillemette | H03M 13/1114 |
| 2016/0234857 | A1* | 8/2016 | Chen | H04W 72/1231 |

OTHER PUBLICATIONS

Qualcomm Incorporated: "DL URLLC/eMBB Dynamic Multiplexing and Indication Design", 3GPP Draft, R1-1702639, DL URLLCEMBB Dynamic Multiplexing and Indication Design, 3rd Generation Partnership Project (3GPP), Mobile Competence Centre, 650, Route Des Lucioles, F-06921 Sophia-Antipolis, vol. RAN WG1, No. Athens, Greece, Feb. 13, 2017-Feb. 17, 2017, Feb. 12, 2017 (Feb. 12, 2017), XP051209790, 9 Pages, Retrieved from the Internet: URL:http://www.3gpp.org/ftp/Meetings_3GPP SYNC/RAN1/Docs/ retrieved on Feb. 12, 2017].

Sequans Communications: "Preemption-Based Multiplexing of URLLC and eMBB in DL", 3GPP Draft; R1-1702117, Preemption-Based Multiplexing of URLLC and EMBB in DL; 3rd Generation Partnership Project (3GPP), Mobile Competence Centre, 650, Route Des Lucioles, F-06921 Sophia-Antipolis, vol. RAN WG1, No. Athens, Greece, Feb. 13, 2017-Feb. 17, 2017; Feb. 12, 2017 (Feb. 12, 2017), XP051209277, 5 Pages, Retrieved from the Internet: URL:http://www.3gpp.org/ftp/Meetings_3GPP_SYNC/RAN1/Docs/ [retrieved on Feb. 12, 2017].

Sony et al., "Considerations on using Indicator in Dynamic DL Resource Sharing between URLLC & eMBB", 3GPP DRAFT; R1-1703122—REL-14 NR-URLLC Corruption Indicator in EMBB V11, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13, 2017-Feb. 17, 2017 Feb. 12, 2017, XP051210260, Retrieved from the Internet: URL;http://www.3gpp.org/ftp/Meetings_3GPP_SYNC/RAN1/Docs/ [retrieved on Feb. 12, 2017], 5 pages.

* cited by examiner

HYBRID INDICATION SCHEME FOR ENHANCED MOBILE BROADBAND AND LOW LATENCY COMMUNICATION MULTIPLEXING

CROSS REFERENCES

The present Application for Patent claims priority to U.S. Provisional Patent Application No. 62/458,547 by Li, et al., entitled "A Hybrid Indication Scheme For Enhanced Mobile Broadband and Low Latency Communication Multiplexing," filed Feb. 13, 2017, assigned to the assignee hereof.

BACKGROUND

The following relates generally to wireless communication and more specifically to a hybrid indication scheme for enhanced mobile broadband (eMBB) and low latency communication multiplexing.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Wireless multiple-access technologies have been adopted in various telecommunication standards to provide a common protocol that enables different wireless devices to communicate on a municipal, national, regional, and even global level. An example telecommunication standard is LTE. LTE is designed to improve spectral efficiency, lower costs, improve services, make use of new spectrum, and better integrate with other open standards. LTE may use OFDMA on the downlink, single-carrier frequency division multiple access (SC-FDMA) on the uplink, and multiple-input multiple-output (MIMO) antenna technology.

LTE or current versions of LTE may not, however, contemplate or address coexistence of certain types of communication. For example, coexistence of high bandwidth communications and low latency, high reliability, or mission critical traffic may not be supported with existing communication schemes.

SUMMARY

Some wireless communications systems may support different types of communications, such as mobile broadband (MBB) communications and low latency communications. Low latency communications may be associated with bursty and unpredictable transmissions. To facilitate low latency communications, a base station may identify resources allocated for MBB communications, and the base station may reassign (or puncture) these resources for low latency communications.

Accordingly, the base station may transmit an indication of the reassigned (or punctured) resources to one or more user equipment (UEs). Specifically, the base station may transmit an indication of the reassigned resources over a designated indication channel during a time slot that is being reassigned (e.g., a current indication). The current indication may include limited information indicating the location of the reassigned resources (or punctured resources). The base station may then transmit another indication of the reassigned resources in a subsequent time slot (e.g., a post indication). The post indication may include the same information to supplement the current indication or additional information for communicating on the reassigned resources.

A method of wireless communication is described. The method may include transmitting a first control message indicating first information associated with a resource assignment for a first transmission of a first transmission type associated with a first transmission time interval (TTI) having a first TTI duration, the first TTI being a subset of a second TTI having a second TTI duration that is greater than the first TTI duration, the first transmission puncturing a second transmission of a second transmission type associated with the second TTI, transmitting the first transmission over the first TTI and the second transmission over portions of the second TTI that are exclusive of the resource assignment for the first transmission, and transmitting a second control message subsequent to the first TTI, the second control message indicating second information associated with the resource assignment for the first transmission of the first transmission type.

An apparatus for wireless communication is described. The apparatus may include means for transmitting a first control message indicating first information associated with a resource assignment for a first transmission of a first transmission type associated with a first TTI having a first TTI duration, the first TTI being a subset of a second TTI having a second TTI duration that is greater than the first TTI duration, the first transmission puncturing a second transmission of a second transmission type associated with the second TTI, means for transmitting the first transmission over the first TTI and the second transmission over portions of the second TTI that are exclusive of the resource assignment for the first transmission, and means for transmitting a second control message subsequent to the first TTI, the second control message indicating second information associated with the resource assignment for the first transmission of the first transmission type.

Another apparatus for wireless communication is described. The apparatus may include a processor, memory in electronic communication with the processor, and instructions stored in the memory. The instructions may be operable to cause the processor to transmit a first control message indicating first information associated with a resource assignment for a first transmission of a first transmission type associated with a first TTI having a first TTI duration, the first TTI being a subset of a second TTI having a second TTI duration that is greater than the first TTI duration, the first transmission puncturing a second transmission of a second transmission type associated with the second TTI, transmit the first transmission over the first TTI and the second transmission over portions of the second TTI that are exclusive of the resource assignment for the first transmission, and transmit a second control message subsequent to the first TTI, the second control message indicating second information associated with the resource assignment for the first transmission of the first transmission type.

A non-transitory computer-readable medium for wireless communication is described. The non-transitory computer-readable medium may include instructions operable to cause a processor to transmit a first control message indicating first information associated with a resource assignment for a first transmission of a first transmission type associated with a first TTI having a first TTI duration, the first TTI being a subset of a second TTI having a second TTI duration that is greater than the first TTI duration, the first transmission puncturing a second transmission of a second transmission type associated with the second TTI, transmit the first transmission over the first TTI and the second transmission over portions of the second TTI that are exclusive of the resource assignment for the first transmission, and transmit a second control message subsequent to the first TTI, the second control message indicating second information associated with the resource assignment for the first transmission of the first transmission type.

Some examples of the method, apparatus, and non-transitory computer-readable medium described above may further include processes, features, means, or instructions for transmitting the first control message in the first TTI having the first duration.

Some examples of the method, apparatus, and non-transitory computer-readable medium described above may further include processes, features, means, or instructions for transmitting the second control message in a third TTI subsequent to the second TTI, the third TTI having the second TTI duration.

Some examples of the method, apparatus, and non-transitory computer-readable medium described above may further include processes, features, means, or instructions for transmitting the second control message in a symbol period of the second TTI that may be subsequent to the first TTI.

In some examples of the method, apparatus, and non-transitory computer-readable medium described above, the first control message comprises systematic bits and the second control message comprises parity bits.

In some examples of the method, apparatus, and non-transitory computer-readable medium described above, the second control message indicates power ratio information or modulation order information, or both, for resources of the second transmission that may be within the first TTI.

Some examples of the method, apparatus, and non-transitory computer-readable medium described above may further include processes, features, means, or instructions for encoding a control message indicating the resource assignment using a forward error correction (FEC) code to obtain a set of encoded bits. Some examples of the method, apparatus, and non-transitory computer-readable medium described above may further include processes, features, means, or instructions for transmitting a first subset of the set of encoded bits as the first control message. Some examples of the method, apparatus, and non-transitory computer-readable medium described above may further include processes, features, means, or instructions for transmitting a second subset of the set of encoded bits as the second control message, wherein the second control message comprises redundancy bits of the set of encoded bits.

In some examples of the method, apparatus, and non-transitory computer-readable medium described above, the FEC code comprises a polar code, a turbo code, or a convolutional code.

Some examples of the method, apparatus, and non-transitory computer-readable medium described above may further include processes, features, means, or instructions for communicating with a UE operating in an ultra-reliable low latency mode on the resource assignment for the first transmission of the first transmission type during the first TTI having the first duration.

Some examples of the method, apparatus, and non-transitory computer-readable medium described above may further include processes, features, means, or instructions for communicating with a UE operating in a MBB mode on resources of the second TTI that may be exclusive of the resource assignment for the first transmission.

A method of wireless communication is described. The method may include receiving a first control message indicating first information associated with a resource assignment for a first transmission of a first transmission type associated with a first TTI having a first TTI duration, the first TTI being a subset of a second TTI having a second TTI duration that is greater than the first TTI duration, the first transmission puncturing a second transmission of a second transmission type associated with the second TTI, receiving the first transmission over the first TTI and the second transmission over portions of the second TTI that are exclusive of the resource assignment for the first transmission, and receiving a second control message subsequent to the first TTI, the second control message indicating second information associated with the resource assignment for the first transmission of the first transmission type.

An apparatus for wireless communication is described. The apparatus may include means for receiving a first control message indicating first information associated with a resource assignment for a first transmission of a first transmission type associated with a first TTI having a first TTI duration, the first TTI being a subset of a second TTI having a second TTI duration that is greater than the first TTI duration, the first transmission puncturing a second transmission of a second transmission type associated with the second TTI, means for receiving the first transmission over the first TTI and the second transmission over portions of the second TTI that are exclusive of the resource assignment for the first transmission, and means for receiving a second control message subsequent to the first TTI, the second control message indicating second information associated with the resource assignment for the first transmission of the first transmission type.

Another apparatus for wireless communication is described. The apparatus may include a processor, memory in electronic communication with the processor, and instructions stored in the memory. The instructions may be operable to cause the processor to receive a first control message indicating first information associated with a resource assignment for a first transmission of a first transmission type associated with a first TTI having a first TTI duration, the first TTI being a subset of a second TTI having a second TTI duration that is greater than the first TTI duration, the first transmission puncturing a second transmission of a second transmission type associated with the second TTI, receive the first transmission over the first TTI and the second transmission over portions of the second TTI that are exclusive of the resource assignment for the first transmission, and receive a second control message subsequent to the first TTI, the second control message indicating second information associated with the resource assignment for the first transmission of the first transmission type.

A non-transitory computer-readable medium for wireless communication is described. The non-transitory computer-readable medium may include instructions operable to cause a processor to receive a first control message indicating first information associated with a resource assignment for a first transmission of a first transmission type associated with a first TTI having a first TTI duration, the first TTI being a subset of a second TTI having a second TTI duration that is greater than the first TTI duration, the first transmission puncturing a second transmission of a second transmission type associated with the second TTI, receive the first transmission over the first TTI and the second transmission over portions of the second TTI that are exclusive of the resource assignment for the first transmission, and receive a second control message subsequent to the first TTI, the second control message indicating second information associated with the resource assignment for the first transmission of the first transmission type.

Some examples of the method, apparatus, and non-transitory computer-readable medium described above may further include processes, features, means, or instructions for receiving the first control message, wherein receiving the first control message comprises receiving the first control message in the first TTI having the first duration.

Some examples of the method, apparatus, and non-transitory computer-readable medium described above may further include processes, features, means, or instructions for receiving the second control message, wherein receiving the second control message comprises receiving the second control message in a third TTI subsequent to the second TTI, the third TTI having the second TTI duration.

Some examples of the method, apparatus, and non-transitory computer-readable medium described above may further include processes, features, means, or instructions for receiving the second control message, wherein receiving the second control message comprises receiving the second control message in a symbol period of the second TTI that may be subsequent to the first TTI.

In some examples of the method, apparatus, and non-transitory computer-readable medium described above, the first control message comprises systematic bits and the second control message comprises parity bits.

In some examples of the method, apparatus, and non-transitory computer-readable medium described above, the second control message indicates power ratio information or modulation order information, or both, for communicating on the resource assignment for the first transmission of the first transmission type.

Some examples of the method, apparatus, and non-transitory computer-readable medium described above may further include processes, features, means, or instructions for identifying a coding scheme for the first control message and the second control message. Some examples of the method, apparatus, and non-transitory computer-readable medium described above may further include processes, features, means, or instructions for decoding the first control message and the second control message based at least in part on the identified coding scheme.

DETAILED DESCRIPTION

Figure 1:
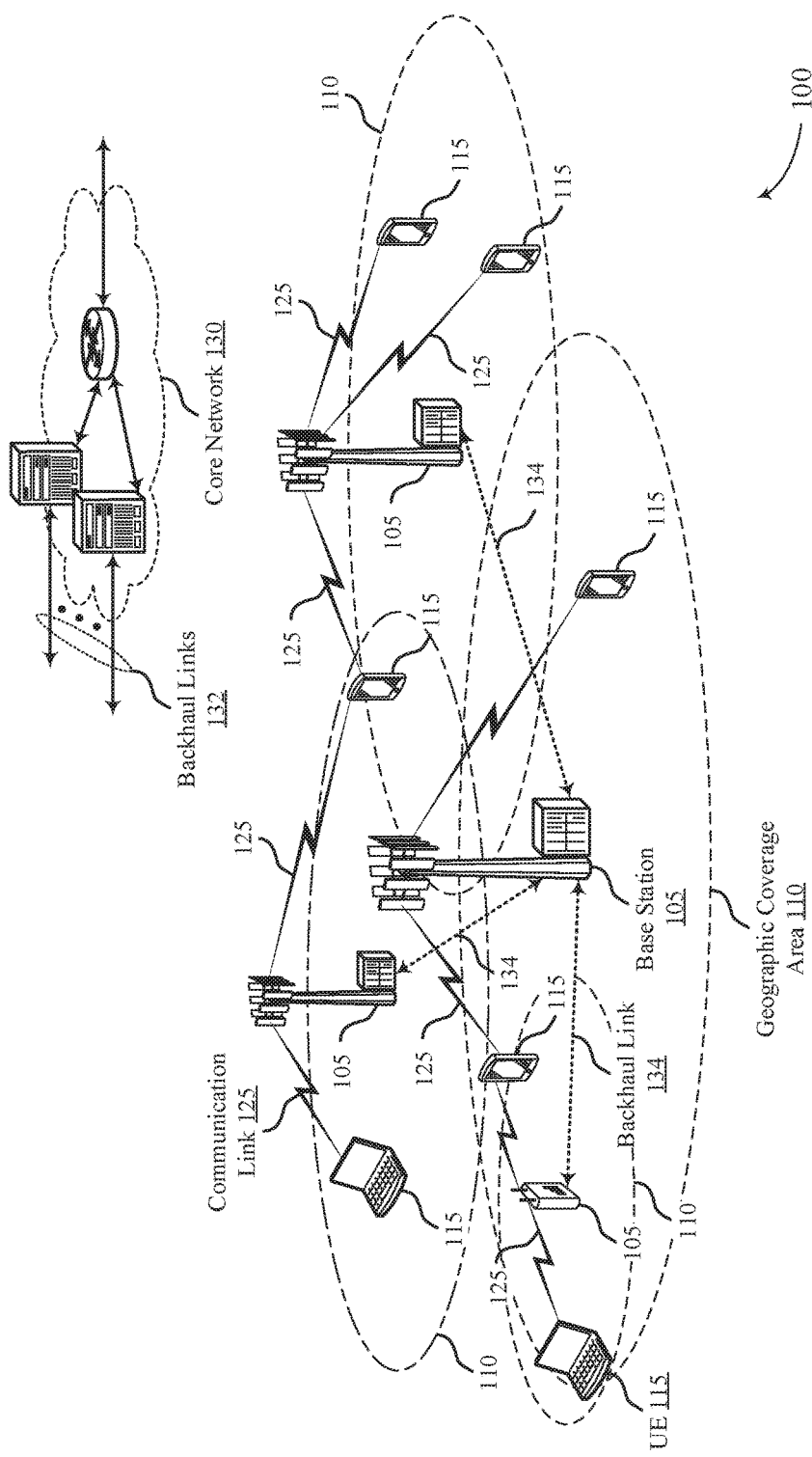
FIG. 1 illustrates an example of a wireless communications system that supports a hybrid indication scheme for mobile broadband (MBB) and low latency communication multiplexing in accordance with various aspects of the present disclosure.

Some wireless communications systems may support mobile broadband (MBB) communications or enhanced MBB (eMBB) communications and low latency communications (e.g., ultra-reliable low latency communications (URLLC)). Generally the description refers to mobile broadband communications as MBB, although it should be understood that this includes MBB or eMBB communications. Low latency communications may be associated with bursty and unpredictable transmissions. To facilitate such communications, a base station may identify resources originally allocated for MBB communications and reassign these resources for low latency communications (e.g., using puncturing). In such cases, the base station may indicate the reassigned resources (or punctured resources) to the UE whose resources have been reassigned and to the UE scheduled for the low latency communications. Efficient techniques for indicating reassigned resources to UEs may be desirable to improve throughput and decrease latency in a wireless communications system.

In some cases, a base station may indicate the reassigned resources (e.g., to one or more UEs) using a designated indication channel concurrent with the reassigned resources. This type of indication may be referred to as a current indication, and the base station may transmit the current indication in the first time slot (e.g., a mini slot) of a set of one or more slots reassigned for low latency communications. However, to support the use of a current indication, a base station may allocate a substantial portion of resources for transmissions over the indication channel. Such an allocation of resources for the indication channel may be wasteful and may increase overhead in a wireless communications system.

In other cases, the base station may indicate the reassigned resources (e.g., to one or more UEs) using an indication sent after the reassigned resources (e.g., in a control channel of an MBB slot). Such an indication may be referred to as a post-indication, and the base station may transmit the post-indication during one or more symbol periods of an MBB slot that is subsequent to a set of one or more slots (e.g., mini-slots) reassigned for the low latency communications. However, because the post-indication is transmitted subsequent to the one or more slots reassigned for low latency communications, a UE communicating on the reassigned resources may experience latency (e.g., for decoding downlink signals), and this may be detrimental to low latency communications.

As described herein, some wireless communications systems may support efficient techniques for indicating reassigned (or punctured) resources to one or more UEs. Specifically, a base station may transmit a current indication and a post-indication to UEs to indicate the location of reassigned (or punctured) resources. The current indication may include limited information that is sufficient to indicate the location in time and/or frequency of the reassigned (or punctured) resources. The post indication may include the same information as the current indication (e.g., to supplement the current indication) or additional information related to the reassigned (or punctured) resources. In some cases, the frequency resources used for the current indication may comprise a part of or overlap with the frequency resources used for the post-indication, although the time resources used may not overlap. Furthermore, each mini-slot may comprise a control channel, which may be referred to as a shortened Physical Downlink Control Channel (sPDCCH). In some cases, the information usually carried over the designated indication channel may be carried over the sPDCCH. Thus, a UE communicating using MBB may also monitor the sPDCCH to determine the reassigned (or punctured) resources for low latency communications.

Aspects of the disclosure introduced above are described below in the context of a wireless communications system. Examples of processes and signaling exchanges that support a hybrid indication scheme for MBB and low latency communication multiplexing are then described. Aspects of the disclosure are further illustrated by and described with reference to apparatus diagrams, system diagrams, and flowcharts that relate to a hybrid indication scheme for MBB and low latency communication multiplexing.

FIG. 1 illustrates an example of a wireless communications system 100 that supports a hybrid indication scheme for MBB and low latency communication multiplexing in accordance with various aspects of the present disclosure. The wireless communications system 100 includes base stations 105, UEs 115, and a core network 130. In some examples, the wireless communications system 100 may be a Long Term Evolution (LTE) (or LTE-Advanced) network, or a New Radio (NR) network.

Wireless communications system 100 may support broadband communications (e.g., MBB), low latency communications (e.g., URLLC), and communications with low-cost and low-complexity devices. URLLC may be referred to as mission critical (MiCr) communications and may be associated with low latency, high reliability, and, in some cases, bursty and unpredictable transmissions. In some cases, low latency communications (e.g., URLLC) may have a higher priority than other types of communication, such as MBB. URLLC, MiCr communications, and low latency communications may be used interchangeably herein.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink channel according to various techniques. Control information and data for one or more types of communications may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, an automobile component, a train, a train component, or the like. UEs 115 may be configured for MBB communications or URLLC communications, or both.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

In some cases, UEs 115 and base stations 105 may support retransmissions of data to increase the chances that data is received successfully. HARQ feedback is one technique of increasing the likelihood that data is received correctly over a wireless communication link 125. HARQ may include a combination of error detection techniques (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., signal-to-noise conditions). In incremental redundancy HARQ, incorrectly received data may be stored in a buffer and combined with subsequent transmissions to improve the overall likelihood of successfully decoding the data. In some cases, redundancy bits are added to each message prior to transmission. This may be useful in poor conditions.

In wireless communications system 100, a transmission time interval (TTI) may be defined as the smallest unit of time in which a base station 105 may schedule a UE 115 for MBB uplink or downlink transmissions. As an example, a base station 105 may allocate one or more TTIs for downlink communication with a UE 115. The UE 115 may then monitor the one or more TTIs to receive downlink signals from the base station 105. In some wireless communications systems (e.g., LTE), a 1 ms subframe may be the basic unit of scheduling or TTI. In other cases, such as with low latency operation, a different, reduced-duration TTI (e.g., a shortened TTI (sTTI)) may be used (e.g., a mini-slot). Wireless communications system 100 may employ various TTI durations, including those that facilitate URLLC and MBB communications, in addition to other types of communication associated with LTE and NR.

A resource element may consist of one symbol period and one subcarrier (e.g., a 15 KHz frequency range). In some cases, the numerology employed within a system (i.e., symbol size, subcarrier size, symbol-period duration, and/or TTI duration) may be selected or determined based on a type of communication. The numerology may be selected or determined in view of an inherent tradeoff between latency for low latency applications and efficiency for other applications, for example. In some cases, the duration of time slots allocated for MBB communications may be greater than the duration of time slots allocated for URLLC. Time slots allocated for URLLC may be referred to as mini-slots or sTTIs.

In some cases, a base station 105 may semi-statically allocate resources of a same carrier for low latency communications and MBB communications, and these different types of communications may be multiplexed over time and frequency resources. However, because low latency communications may be unpredictable, it may be challenging for a base station to allocate an appropriate amount of resources for low latency communications with a UE 115. For example, if the base station allocates a small amount of resources for low latency communications, there may not be sufficient resources available for communication when data traffic is high. Alternatively, if a base station allocates a large amount of resources for low latency communications, resources may be unused when data traffic is low. Accordingly, rather than semi-statically allocating resources for low latency communication, a base station 105 may interrupt MBB communications (e.g., using puncturing) to accommodate bursty low latency communications.

Thus, low latency communications and MBB communications may be multiplexed in the time domain using puncturing. In such cases, it may be appropriate for the base station 105 to indicate the resources reassigned (or punctured) for low latency communications to a UE 115 operating in a low latency mode (i.e., a low latency UE 115) and a UE 115 operating in an MBB mode (i.e., an MBB UE 115). Specifically, the base station 105 may transmit a resource grant to the low latency UE 115 that punctures a grant to an MBB UE 115 and an indication of the punctured resources to the MBB UE 115. The indication may contain information such as a flag on the resources reassigned for low latency communications, the specific time and frequency resources reassigned, power ratio information to be used for communication on the reassigned resources, etc.

The low latency UE 115 may receive the resource grant and communicate with a base station 105 on the reassigned (or punctured) resources. A physical channel may be defined for the low latency resource grant and indication of punctured resources. As such, the low latency UE 115 may save power by avoiding monitoring a wide bandwidth for downlink signals (e.g., for downlink low latency control communication). The MBB UE 115 may receive the indication and refrain from communicating with the base station 105 on the punctured resources. As such, the decoding performance (e.g., block error rate (BLER)) of the MBB UE 115 may be improved and the MBB UE 115 may save power.

In some cases, the base station 105 may transmit the indication using different resources or channels. In one example, the base station 105 may transmit the indication over an indication channel in the same TTI reassigned (or punctured) for low latency communications. Such an indication may be referred to as a current indicator. However, in some cases, a base station 105 may allocate substantial resources for the indication channel, which may result in high overhead in a wireless communications system. In another example, the base station 105 may transmit the indicator in a time period (e.g., symbol period or TTI) subsequent to the reassigned resources for low latency communications. Such an indication may be referred to as a post-indicator. However, because the post-indicator is transmitted at a time subsequent to the resources reassigned for low latency communications, the MBB UE may have to wait or reprocess resources of a TTI having punctured resources, which may increase an overall processing complexity.

Wireless communications system 100 may support efficient techniques for indicating punctured resources to an MBB UE 115 and a low latency UE 115. Specifically, a base station 105 may use a current indicator and a post-indicator to indicate punctured resources. In some cases, the base station 105 may include limited information (or a reduced amount of bits) in the current indicator to indicate the location of reassigned resources. As such, a base station 105 may be able to allocate less resources for the indicator channel, resulting in reduced overhead. The base station 105 may then transmit additional information (or additional bits) in the post-indicator to indicate the location of the reassigned resources. As such, the base station may be able to provide supplemental or additional information in the post-indicator. In some other cases, the base station may not allocate any resources for a dedicated indication channel, and may instead transmit the current indicator over a sPDCCH of a mini-slot.

Figure 2:
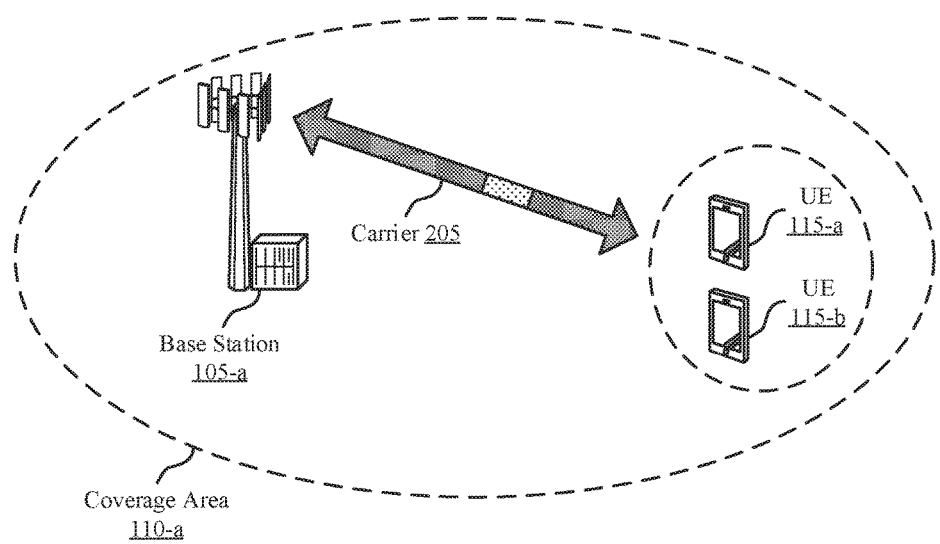
FIG. 2 illustrates an example of a wireless communications system that supports a hybrid indication scheme for MBB and low latency communication multiplexing in accordance with various aspects of the present disclosure.

FIG. 2 illustrates an example of a wireless communications system 200 that supports a hybrid indication scheme for MBB and low latency communication multiplexing in accordance with various aspects of the present disclosure. Wireless communications system 200 may include base station 105-a, which may be an example of a base station 105 described with reference to FIG. 1. Wireless communications system 200 may also include UE 115-a and UE 115-b, which may be examples of a UE 115 described with reference to FIG. 1. In the present example, UE 115-a may operate in a low latency mode and may be referred to as a low latency UE 115-a, and UE 115-b may operate in an MBB mode and may be referred to as an MBB UE 115-b. Base station 105-a may provide communication coverage for a respective coverage area 110-a, which may be an example of a coverage area 110 described with reference to FIG. 1. Although the present example describes communication between a base station and two UEs 115, it is to be understood that the techniques described herein may be applicable to a single UE capable of operating in an MBB mode and a low latency mode.

Wireless communications system 200 may support different types of wireless communications, including MBB communications 210 and low latency communications 215. As discussed above, low latency UE 115-a may operate in a low latency mode and may communicate with base station 105-a over carrier 205 (e.g., low latency communications 215), and MBB UE 115-b may operate in an MBB mode and may communicate with base station 105-*a* over the same carrier 205 (e.g., MBB communications 210). As described with reference to FIG. 1, low latency communications 215 may be bursty and unpredictable. Accordingly, when base station 105-*a* or low latency UE 115-*a* identifies low latency data to transmit, base station 105-*a* may reassign resources originally allocated for MBB communications 210 for low latency communications 215 (e.g., using puncturing). In such cases, it may be appropriate for the base station 105-*a* to indicate the time and frequency resources reassigned for low latency communications 215 (e.g., punctured resources).

Wireless communications system 200 may support efficient techniques for indicating resources reassigned for low latency communications 215. Specifically, a base station 105-*a* may transmit a current indicator and a post-indicator to UEs 115 including information for communicating on resources of carrier 205. The current indicator may include limited information to reduce overhead, and the post indicator may include supplemental or additional information. In some examples, the current indicator may include systematic bits, and the post-indicator may include parity bits. In other examples, the current indicator may include a flag indicating resources reassigned for low latency communications 215, and the post-indicator may include an indication of the reassigned resources in addition to other information. In yet other examples, base station 105-*a* may encode an indication of the resources reassigned for low latency communications 215, and base station 105-*a* may transmit a subset of the encoded bits as the current indicator and another subset of the encoded bits as the post-indicator, where the post indicator includes redundancy bits of the encoded bits.

UEs 115 may receive the current indicator and identify a strategy for communicating on the resources reassigned for low latency communications 215 based on the current indicator. For example, low latency UE 115-*a* may receive and decode the current indicator and may determine to transmit or monitor for a transmission on the resources reassigned for low latency communications 215. If low latency UE 115-*a* is unable to decode the current indicator, low latency UE 115-*a* may not be able to communicate with base station 105-*a*. MBB UE 115-*b* may also receive and decode the indication, and MBB UE 115-*b* may determine to refrain from communicating on the resources reassigned for low latency communications 215. If MBB UE 115-*b* is unable to decode the current indicator, MBB UE 115-*b* may proceed with normal communications on the resources originally allocated for MBB communications 210.

MBB UE 115-*b* may then receive the post-indicator and may identify a strategy for communicating on the resources reassigned for low latency communications 215. As an example, for downlink communication, MBB UE 115-*b* may receive the post-indicator and determine to avoid decoding downlink signals received on the resources reassigned for low latency communications. As such, MBB UE 115-*b* may save power and improve its decoding performance (e.g., BLER). In another example, for downlink communication, MBB UE 115-*b* may identify power ratio information and modulation order information used for an MBB downlink transmission on portions of a TTI including resources reassigned for low latency communication, and MBB UE 115-*b* may use the power ratio information and the modulation order information in decoding the downlink transmission.

Figure 3:
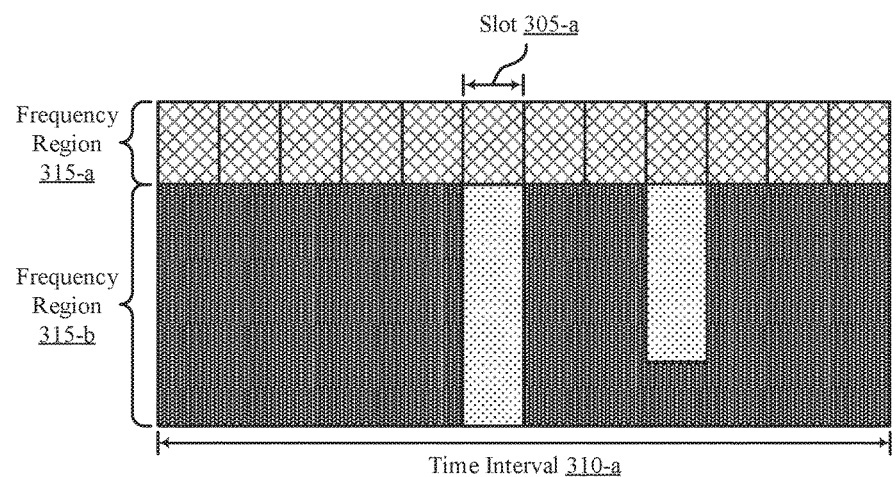
FIGS. 3-4 illustrate examples of portions of a hybrid indication scheme for MBB and low latency communication multiplexing in accordance with various aspects of the present disclosure.
Figure 3:
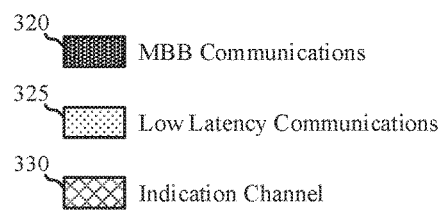

FIG. 3 illustrates an example of a portion of a hybrid indication scheme 300 for MBB and low latency communication multiplexing in accordance with various aspects of the present disclosure. In some cases, the base station 105 or a UE 115 operating in an ultra-reliable low latency mode may identify low latency data to transmit. In such cases, the base station 105 may reassign (or puncture) resources allocated for MBB communications 320 to accommodate low latency communications 325. Accordingly, it may be appropriate for the base station 105 to transmit an indication of the resources reassigned (or punctured) for the low latency communications 325.

In some examples, the base station 105 may transmit the indication in the indication channel 330. Specifically, for low latency communications in slot 305-*a* (e.g., a mini-slot), the base station 105 may transmit the indication in slot 305-*a* of indication channel 330. Such an indication may be referred to as a current indication. The use of the current indication may provide sufficient time for a HARQ process (e.g., for a HARQ turn-around) and may support low latency since a UE is able to identify reassigned resources immediately. However, the use of a current indication may result in high overhead since a large amount of resources may be allocated for indication channel 330. Accordingly, to reduce overhead, base station 105-*a* may limit the information included in a current indication, and the base station may allocate less resources for the indication channel 330. The base station may then transmit a second indication in a control channel for the MBB communications that may include supplemental or additional information. In some examples, the indication channel 330 may be within a region 315-*a* for control information that is separate from a region 315-*b* for data communications (e.g., PDSCH, sPDSCH). That is, the indication channel 330 may be transmitted in each mini-slot 305 on resources reserved for control information for low latency communications.

Figure 4:
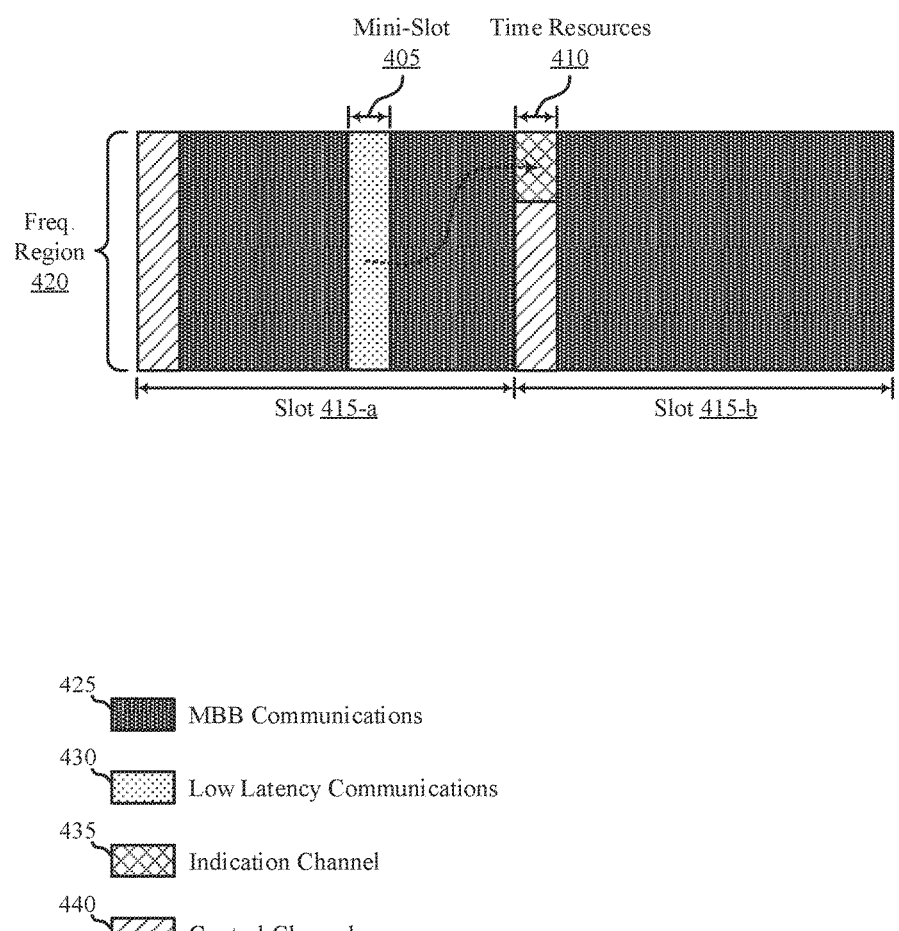

FIG. 4 illustrates an example of a portion of a hybrid indication scheme 400 for MBB and low latency communication multiplexing in accordance with various aspects of the present disclosure. A base station 105 may operate over frequency region 420 for MBB communications 425. In some cases, the base station 105 or a UE 115 operating in an ultra-reliable low latency mode may identify low latency data to transmit. In such cases, the base station 105 may reassign (or puncture) resources allocated for MBB communications 425 for low latency communications 430. Accordingly, it may be appropriate for the base station 105 to transmit an indication of the resources reassigned (or punctured) for low latency communications 430.

In some examples, the base station 105 may transmit the indication in an indication channel 435 of a control channel 440 designated for control information on resources of frequency region 420. That is, the base station 105 may transmit the indication on time resources 410 of slot 415-*b* (e.g., one or more symbol periods). Furthermore, in some cases, each mini-slot 405 of slot 415-*a*, 415-*b*, or both, may comprise a shortened downlink control channel, such as a sPDCCH. In some cases, the sPDCCH may span a part of, or the entire frequency region 420. As illustrated, slot 415-*b* may be subsequent to slot 405 (e.g., a mini-slot). Thus, a UE may not receive an indication of the resources reassigned for low latency communications 430 during slot 405 until after slot 405. Such an indication may be referred to as a post-indication. The use of a post-indicator may allow a base station 105 to reuse resources of a control channel or other available symbols of a slot (e.g., resources of slot 415-*a* subsequent to mini-slot 405). However, since the UE may receive the indication subsequent to slot 405, the use of a post-indication may result in additional latency, and this may be detrimental to low latency communications 430.

Accordingly, a base station 105 may use the post-indicator in addition to using a current indicator to identify resources reassigned for low latency communications 430. A low latency UE and an MBB UE may use the current indication to identify resources reassigned (or punctured) for low latency communications 430, and the UEs may identify a strategy for communicating on these resources (e.g., slot 405) based on the current indication. In addition, the MBB UE may use the post-indication to identify additional information for communicating on resources of frequency region 420. In some examples, for downlink communication, the MBB UE may identify power ratio information or modulation order information for communicating on resources of frequency region 420 (e.g., frequency resources of mini-slot 405 not assigned for low latency communications). In other examples, for downlink communication, the MBB UE may identify information indicating the time and frequency resources reassigned for low latency communications 430. As such, the MBB UE may use this information (e.g., if the UE was unable to decode the current indication) to identify the reassigned (or punctured) resources and refrain from communicating on these resources. For instance, in some cases, the MBB UE may check if the MBB communications 425 is punctured for any mini-slots of the slot 415-*a*, prior to decoding resources associated with an MBB transmission for the UE.

Figure 5:
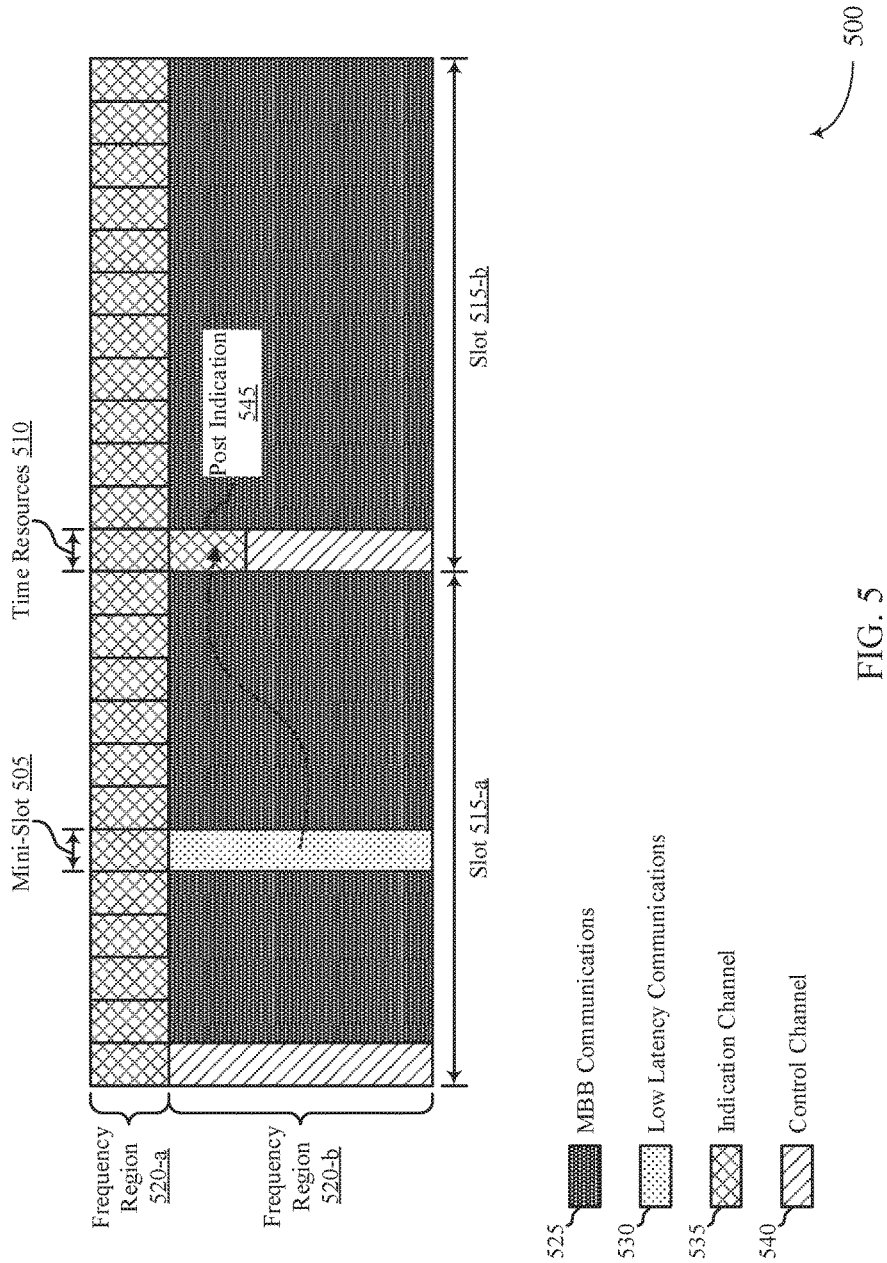
FIG. 5 illustrates an example of a hybrid indication scheme for MBB and low latency communication multiplexing in accordance with various aspects of the present disclosure.

FIG. 5 illustrates an example of a hybrid indication scheme 500 for MBB and low latency communication multiplexing in accordance with various aspects of the present disclosure. A base station 105 may communicate via frequency region 520-*b*. In some cases, the base station 105 or a UE 115 operating in an ultra-reliable low latency mode may identify low latency data to transmit (e.g., URLLC traffic). In such cases, the base station 105 may reassign (or puncture) resources originally allocated for MBB communications 525 for low latency communications 530. Accordingly, it may be appropriate for the base station 105 to transmit an indication of the resources reassigned (or punctured) for the low latency communications 530.

In some cases, the base station 105 may transmit a current indication on indication channel 535 during mini-slot 505. The current indication may identify resources of frequency region 520-*b* reassigned for low latency communication during mini-slot 505. To reduce overhead, the base station 105 may include limited information in the current indication. A low latency UE may receive and decode the indication and communicate on the reassigned resources with the base station 105 (e.g., transmit uplink signals or monitor for downlink signals). The low latency UE may receive additional control information in a control channel for the mini-slot (e.g., an sPDCCH). A UE 115 operating in an MBB mode may also receive and decode the indication and refrain from communicating on the reassigned resources (e.g., refrain from transmitting uplink signals or monitoring for downlink signals).

The base station 105 may then transmit a post-indication 545 on time resources 510 after mini-slot 505. Post-indication 545 may be transmitted during one or more symbols of slot 515-*a* (e.g., at the end of slot 515-*a*), or one or more symbols of slot 515-*b*. For example, the base station 105 may transmit the post-indication 545 in a control channel 540 of slot 515-*b*. The post-indication may be used to supplement the current indication. In some cases, the control channel 540 may be a PDCCH. In some examples, the indication channel 535 may be in a frequency region 520-*a* separate from (e.g., frequency-division multiplexed with) frequency region 520-*b*. Alternatively, in some cases, the indication channel 535 and/or control channel 540, transmitted over time resources 510, may transmitted in frequency region 520-*b*. Thus, in some cases, region 520-*a* may span frequency resources of region 520-*b*. In some cases, each slot 505 or time resources 510 of slot 515-*a* or 515-*b*, respectively, may include its own control channel (e.g., sPDCCH). Furthermore, in some cases, the sPDCCH may span the frequency regions occupied by frequency region 520-*a* and frequency region 520-*b*. Thus, in some cases, the sPDCCH of slot 510 may comprise the information carried over indication channel 535.

In one example, the current indication may include systematic bits and the post indication may include parity bits that indicate the resources reassigned for low latency communications. Additionally or alternatively, the post indication may include additional information for communication on resources reassigned for low latency communication. For example, the post indication may include power ratio information, modulation order information, etc. for an MBB UE to use for communication on resources reassigned for low latency communications.

Further, in some instances, a base station 105 may encode an indication of the reassigned resources, and the base station 105 may transmit a first subset of the encoded bits as the current indication and a second subset of the encoded bits as the post indication. The post indication may include redundancy bits (e.g., without the base station 105 receiving HARQ feedback), and if an MBB UE is unable to decode the current indication, the MBB UE may combine the current indication and the post indication to identify the resources reassigned for low latency communications. In some examples, the base station 105 may use an FEC code (e.g., a polar code, a turbo code, or a convolutional code) to encode the indication. That is, the base station 105 may employ HARQ techniques for transmitting the current and post indications. In some cases, a HARQ scheme based on a class of rate-compatible polar codes may be applied to the techniques described herein.

A UE operating in an MBB mode may receive the post-indication and use the information included in the post-indication for communicating on resources reassigned for low latency communications. If the UE was unable to decode the current indication, the UE may use the post indication to identify the resources reassigned for low latency communications (i.e., during slot 505). The UE may then refrain from attempting to decode signals received during slot 505, and this may improve the decoding efficiency (e.g., BLER) of the UE. In other cases, the UE may use the power ratio information and modulation order information included in the post indication to attempt to decode downlink signals received during slot 505.

Although the present example describes a current indication transmitted in an indication channel 535 (e.g., frequency-division multiplexed), it is to be understood that a base station 105 may transmit a current indication of resources reassigned (or punctured) for low latency communications using other techniques. In some cases, a base station 105 may transmit a current indication in the same frequency region and during the same slot (e.g., slot 505) reassigned for low latency communications (e.g., time-division multiplexed). In other cases, a base station 105 may implicitly indicate the location of resources reassigned (or punctured) for low latency communications. For example, the base station 105 may transmit reference signals, or a part of the control information, in each mini-slot on resources of frequency region 520-*b* (e.g., to facilitate channel estimation), and the base station may use different reference signal sequences, or a part of the control information, to implicitly convey information related to communication on resources of frequency region 520-*b*. For example, a base station 105 may use a specific reference signal sequence to indicate the location of resources reassigned (or punctured) for low latency communications (e.g., as a flag).

Figure 6:
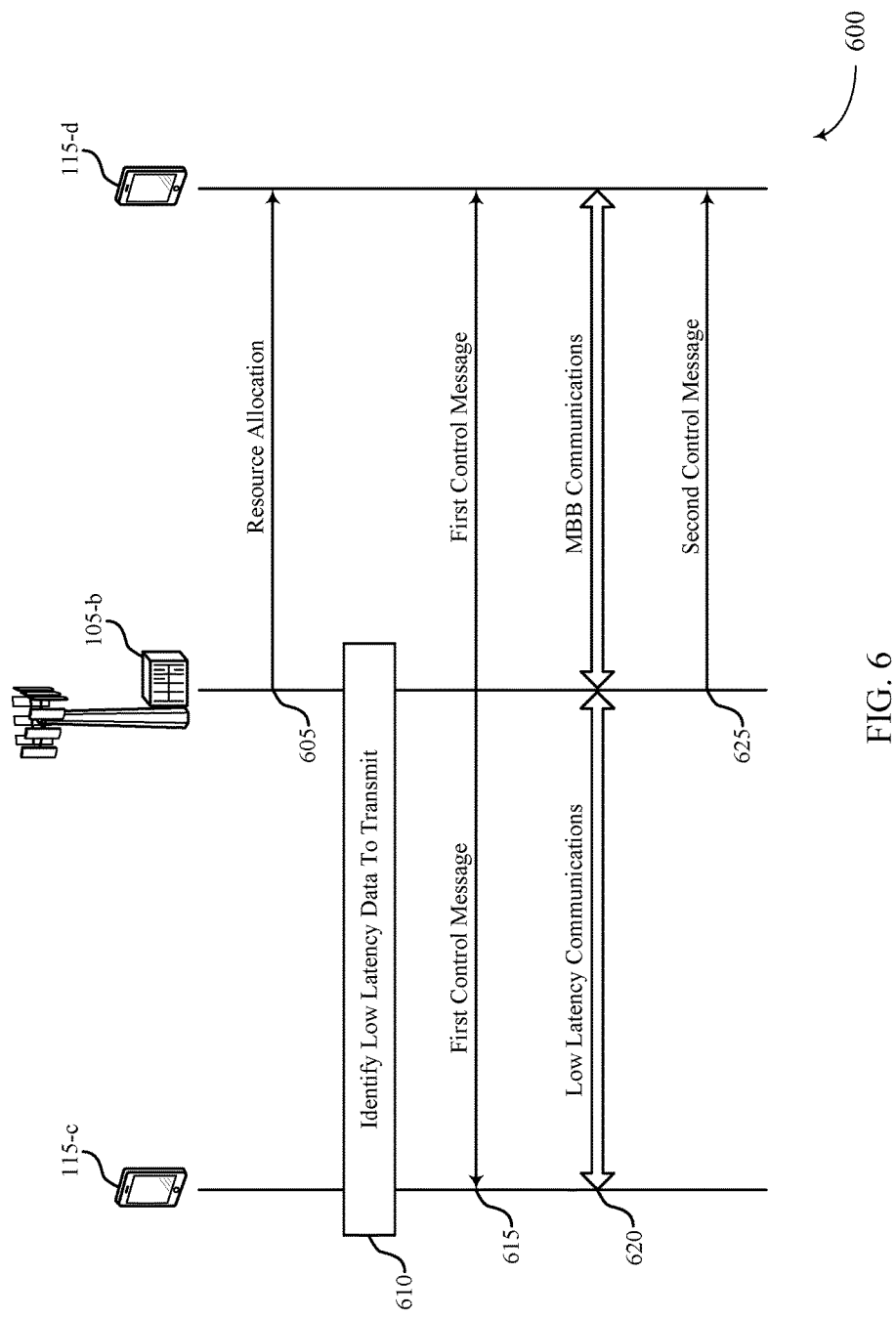
FIG. 6 illustrates an example of a process flow in a system that supports a hybrid indication scheme for MBB and low latency communication multiplexing in accordance with various aspects of the present disclosure.

FIG. 6 illustrates an example of a process flow 600 in a system that supports a hybrid indication scheme for MBB and low latency communication multiplexing in accordance with various aspects of the present disclosure. Process flow 600 illustrates aspects of techniques performed by a base station 105-*b*, which may be an example of a base station 105 described with reference to FIGS. 1 and 2. Process flow 600 may also illustrate aspects of techniques performed by a UE 115-*c* and a UE 115-*d*, which may be examples of a UE 115 described with reference to FIGS. 1 and 2. UE 115-*c* may operate in a low latency mode and may be referred to as low latency UE 115-*c*, and UE 115-*d* may operate in an MBB mode and may be referred to as MBB UE 115-*d*.

At 605, base station 105-*b* may allocate resources of an MBB TTI for MBB communications with MBB UE 115-*d*, and base station 105-*b* may begin to communicate with MBB UE 115-*d* on the allocated resources. At 610, low latency UE 115-*c* or base station 105-*b* may identify low latency data to transmit. In such cases, base station 105-*b* may identify the resources allocated for MBB communications, and base station 105-*b* may reassign (or puncture) a portion of these resources for low latency communications with low latency UE 115-*c*.

At 615, base station 105-*b* may then transmit a first control message (e.g., a current indication) to low latency UE 115-*c* and MBB UE 115-*d*. In some cases, base station 105-*b* may transmit the first control message on resources of a first set of resources allocated for control information (e.g., an indication channel). In some cases, the first set of resources includes a first frequency region of a system bandwidth. The indication channel may be transmitted for each of a first set of low latency TTIs within the MBB TTI, where each low latency TTI has a first duration (e.g., mini-slots). The first control message may indicate an assignment of resources (e.g., the reassigned or punctured) resources for communications (e.g., low latency communications) during a TTI having the first duration. In some cases, the assignment of resources may be for a second frequency region that is frequency-division multiplexed with the first frequency region. In some other cases, the base station may not allocate any dedicated resources for an indication channel, and may instead transmit the current indicator over a sPDCCH of a mini-slot, the sPDCCH spanning a portion of a PDSCH region for MBB communications.

Base station 105-*b* may transmit the first control message in a first TTI having the first duration, where the assignment of resources for low latency communication includes an assignment of resources in the first TTI (e.g., a mini-slot). In some cases, base station 105-*a* may process an indication of the resources reassigned (or punctured) for low latency communications to generate systematic bits and parity bits, and the base station 105-*a* may include the systematic bits in the first control message. In other cases, base station 105-*b* may encode a control message indicating the reassigned (or punctured) resources using an FEC code (e.g., polar code, turbo code, or a convolutional code) to obtain a set of encoded bits. The base station 105-*b* may then transmit a first subset of the set of encoded bits as the first control message. Low latency UE 115-*c* and MBB UE 115-*d* may receive the first control message and identify the coding scheme used to encode the first control message. The UEs 115 may then decode the first control message based on the identified coding scheme.

At 620, base station 105-*b* may communicate with low latency UE 115-*c* on the resources that are reassigned (or punctured) for low latency communications based on the first control message (or additional control messages). In addition, base station 105-*b* may communicate with MBB UE 115-*d* on all other resources allocated for MBB communications that were not reassigned (or punctured) based on the first control message (e.g., resources of the MBB TTI outside of the low latency TTI, and resources within the low-latency TTI that were not reassigned). That is, base station 105-*b* may refrain from communicating with MBB UE 115-*d* on the reassigned (or punctured) resources based on the first control message.

At 625, base station 105-*b* may transmit a second control message (e.g., a post-indication) to low latency UE 115-*c* and/or MBB UE 115-*d*. In some cases, base station 105-*b* may transmit the second control message in a control channel allocated for MBB communications. In some examples, the second control message may be transmitted at the end of the MBB TTI having the punctured resources (e.g., within one or more symbols at the end of the MBB TTI). In other examples, the second control message may be sent in a subsequent MBB TTI (e.g., in a PDCCH for the next MBB TTI). The second control message may also indicate the assignment of resources (e.g., the reassigned or punctured resources) for the communications (e.g., low latency communications) during the TTI having the first duration. The MBB UE 115-*d* may receive the second control message.

In some cases, the second control message may include the parity bits generated at 615. In other cases, the second control message may indicate power ratio information or modulation order information, or both, for communicating on resources of the MBB TTI having portions punctured by the low latency communications (e.g., for frequency resources within the low latency TTI that are not reassigned). In yet other cases, base station 105-*b* may transmit a second subset of the set of encoded bits generated at 615 as the second control message. Specifically, the second control message may include redundancy bits of the set of encoded bits. MBB UE 115-*d* may receive the second control message and identify the coding scheme used to encode the second control message. MBB UE 115-*d* may then decode the second control message based on the identified coding scheme. MBB UE 115-*d* may decode data received at 620 from base station 105-*b* based on the first control message and/or the second control message. That is, MBB UE 115-*d* may communicate with base station 105-*b* based on the first control message and/or the second control message.

Figure 7:
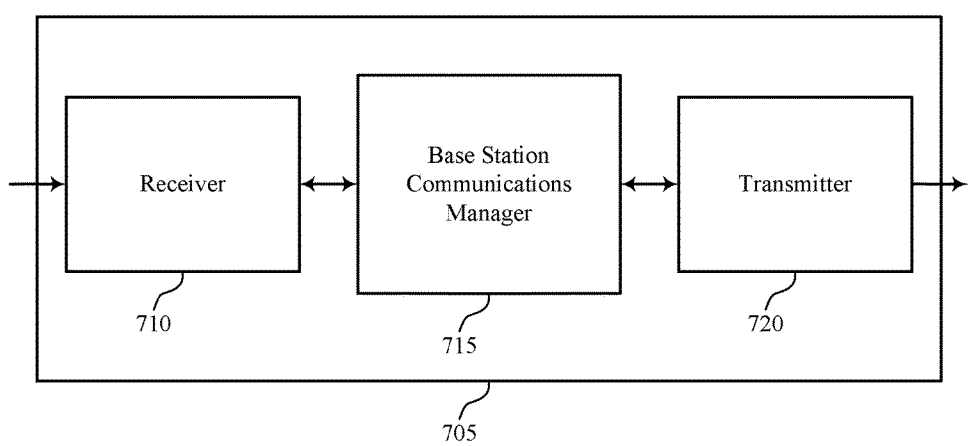
FIGS. 7 through 9 show block diagrams of a device or devices that support a hybrid indication scheme for MBB and low latency communication multiplexing in accordance with various aspects of the present disclosure.

FIG. 7 shows a block diagram 700 of a wireless device 705 that supports a hybrid indication scheme for MBB and low latency communication multiplexing in accordance with various aspects of the present disclosure. Wireless device 705 may be an example of aspects of a base station 105 as described with reference to FIG. 1. Wireless device 705 may include receiver 710, base station communications manager 715, and transmitter 720. wireless device 705 may also include a processor. Each of these components may be in communication with one another (e.g., via one or more buses).

Receiver 710 may receive information such as packets, user data, or control information associated with various information channels (e.g., control channels, data channels, and information related to a hybrid indication scheme for MBB and low latency communication multiplexing, etc.). Information may be passed on to other components of the device. The receiver 710 may be an example of aspects of the transceiver 1035 described with reference to FIG. 10.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may include a single antenna, or it may include a set of antennas.

Base station communications manager 715 may be an example of aspects of the base station communications manager 1015 described with reference to FIG. 10. Base station communications manager 715 and/or at least some of its various sub-components may be implemented in hardware, software executed by a processor, firmware, or any combination thereof. If implemented in software executed by a processor, the functions of the base station communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The base station communications manager 715 and/or at least some of its various sub-components may be physically located at various positions, including being distributed such that portions of functions are implemented at different physical locations by one or more physical devices. In some examples, base station communications manager 715 and/or at least some of its various sub-components may be a separate and distinct component in accordance with various aspects of the present disclosure. In other examples, base station communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 715 may transmit a first control message indicating first information associated with a resource assignment for a first transmission of a first transmission type associated with a first TTI having a first TTI duration, the first TTI being a subset of a second TTI having a second TTI duration that is greater than the first TTI duration, the first transmission puncturing a second transmission of a second transmission type associated with the second TTI. Base station communications manager 715 may transmit the first transmission over the first TTI and the second transmission over portions of the second TTI that are exclusive of the resource assignment for the first transmission (e.g., resources of the second TTI exclusive of the first TTI, and resources of the first TTI that are not reassigned for the first transmission). In some cases, the base station communications manager 715 may transmit a second control message subsequent to the second TTI, the second control message indicating second information associated with the resource assignment for the first transmission of the first transmission type. The first transmission type may be, for example, low latency communications and the second transmission type may be, for example, MBB communications.

Base station communications manager 715 may coordinate with a receiver 710 and a transmitter 720 to communicate on resources exclusive of the resource assignment for the first transmission based on the first control message and the second control message, for the second transmission.

Figure 8:
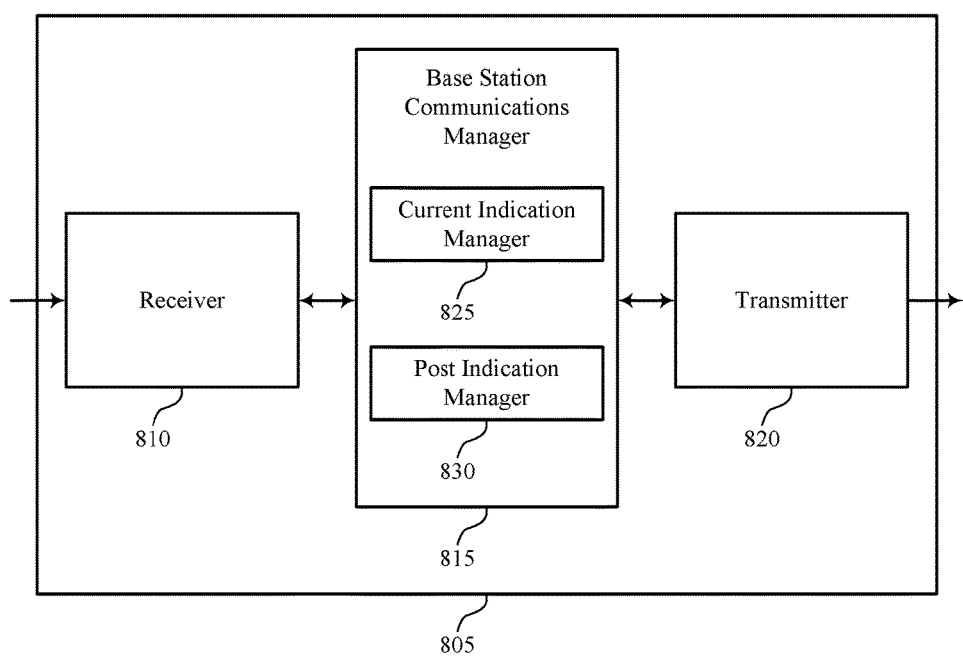

FIG. 8 shows a block diagram 800 of a wireless device 805 that supports a hybrid indication scheme for MBB and low latency communication multiplexing in accordance with various aspects of the present disclosure. Wireless device 805 may be an example of aspects of a wireless device 705 or a base station 105 as described with reference to FIGS. 1 and 7. Wireless device 805 may include receiver 810, base station communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to a hybrid indication scheme for MBB and low latency communication multiplexing, etc.). Information may be passed on to other components of the device. The receiver 810 may be an example of aspects of the transceiver 1035 described with reference to FIG. 10.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may include a single antenna, or it may include a set of antennas.

Base station communications manager 815 may be an example of aspects of the base station communications manager 1015 described with reference to FIG. 10. Base station communications manager 815 may also include current indication manager 825 and post indication manager 830.

Current indication manager 825 may transmit a first control message indicating first information associated with a resource assignment for a first transmission of a first transmission type associated with a first TTI having a first TTI duration (e.g., mini-slot), the first TTI being a subset of a second TTI having a second TTI duration that is greater than the first TTI duration, the first transmission puncturing a second transmission of a second transmission type associated with the second TTI. Current indication manager 825 may transmit the first control message in the first TTI having the first duration. In some examples, the first control message comprises a first subset of a set of encoded bits of a control message associated with the first transmission. In some cases, the first control message includes systematic bits.

Post indication manager 830 may transmit a second control message subsequent to the first TTI, the second control message indicating second information associated with the resource assignment for the first transmission of the first transmission type. In some cases, the second control message comprises a second subset of the set of encoded bits. For example, the second control message may include redundancy bits of the set of encoded bits. In some cases, the second control message includes a post-indicator, and may be transmitted at the end of the second TTI or in a third TTI of the second duration that is subsequent to the second TTI. In some cases, the second control message indicates power ratio information or modulation order information, or both, for resources of the second transmission of the second transmission type that are exclusive of the reassigned resources of the first TTI. In some cases, the second control message includes parity bits.

Base station communications manager 815 may coordinate with receiver 810 and transmitter 820 to communicate on resources exclusive of the resource assignment for the first transmission based on the first control message and the second control message, for the second transmission.

Figure 9:
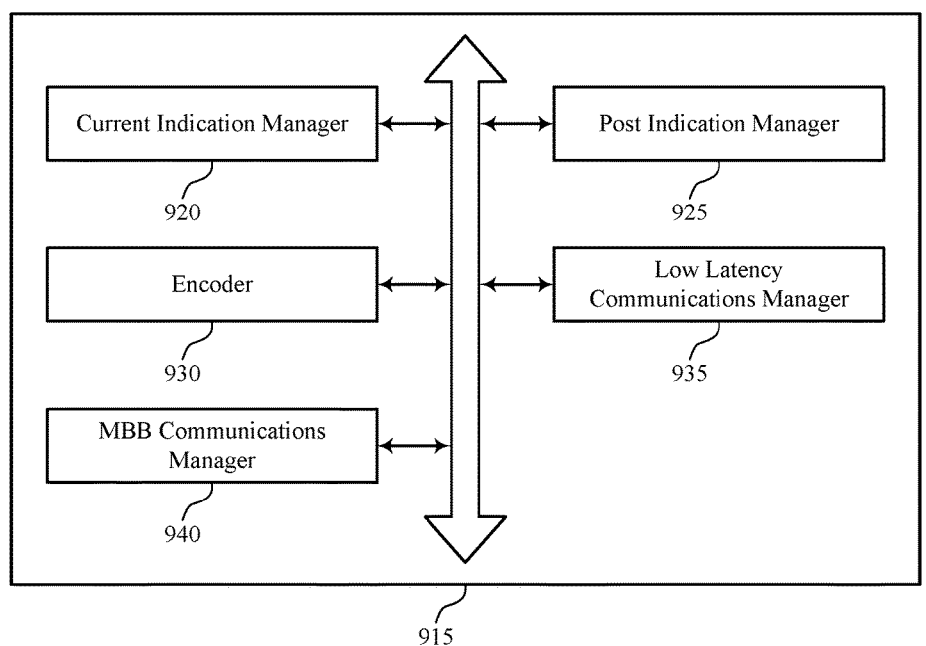

FIG. 9 shows a block diagram 900 of a base station communications manager 915 that supports a hybrid indication scheme for MBB and low latency communication multiplexing in accordance with various aspects of the present disclosure. The base station communications manager 915 may be an example of aspects of a base station communications manager 715, a base station communications manager 815, or a base station communications manager 1015 described with reference to FIGS. 7, 8, and 10. The base station communications manager 915 may include current indication manager 920, post indication manager 925, encoder 930, low latency communications manager 935, and MBB communications manager 940. Each of these modules may communicate, directly or indirectly, with one another (e.g., via one or more buses).

Current indication manager 920 may transmit a first control message indicating first information associated with a resource assignment for a first transmission of a first transmission type associated with a first TTI having a first TTI duration, the first TTI being a subset of a second TTI having a second TTI duration that is greater than the first TTI duration, and the first transmission puncturing a second transmission of a second transmission type associated with the second TTI. Current indication manager 920 may transmit the first control message in the first TTI having the first duration. In some examples, the first control message may include a first subset of a set of encoded bits of a control message associated with the first transmission. In some cases, the first control message includes a current indicator and the first TTI is a mini-slot of the second TTI (e.g., an MBB TTI). In some cases, the first control message includes systematic bits.

Post indication manager 925 may transmit a second control message subsequent to the first TTI, the second control message indicating second information associated with the resource assignment for the first transmission of the first transmission type. In some cases, the second control message comprises a second subset of the set of encoded bits. For example, the second control message may include redundancy bits of the set of encoded bits. In some cases, the second control message includes a post-indicator, and may be transmitted at the end of the second TTI or in a third TTI of the second duration that is subsequent to the second TTI. In some cases, the second control message indicates power ratio information or modulation order information, or both, for resources of the second transmission of the second transmission type that are exclusive of the reassigned resources of the first TTI. In some cases, the second control message includes parity bits.

Encoder 930 may encode a control message indicating the resource assignment using a FEC code to obtain the set of encoded bits. In some cases, the FEC code includes a polar code, a turbo code, or a convolutional code. Low latency communications manager 935 may communicate with a UE operating in an ultra-reliable low latency mode on the resource assignment for the first transmission of the first transmission type during the first TTI having the first duration. MBB communications manager 940 may communicate with a UE operating in an MBB mode on resources that are exclusive of the resource assignment for the first transmission.

Figure 10:
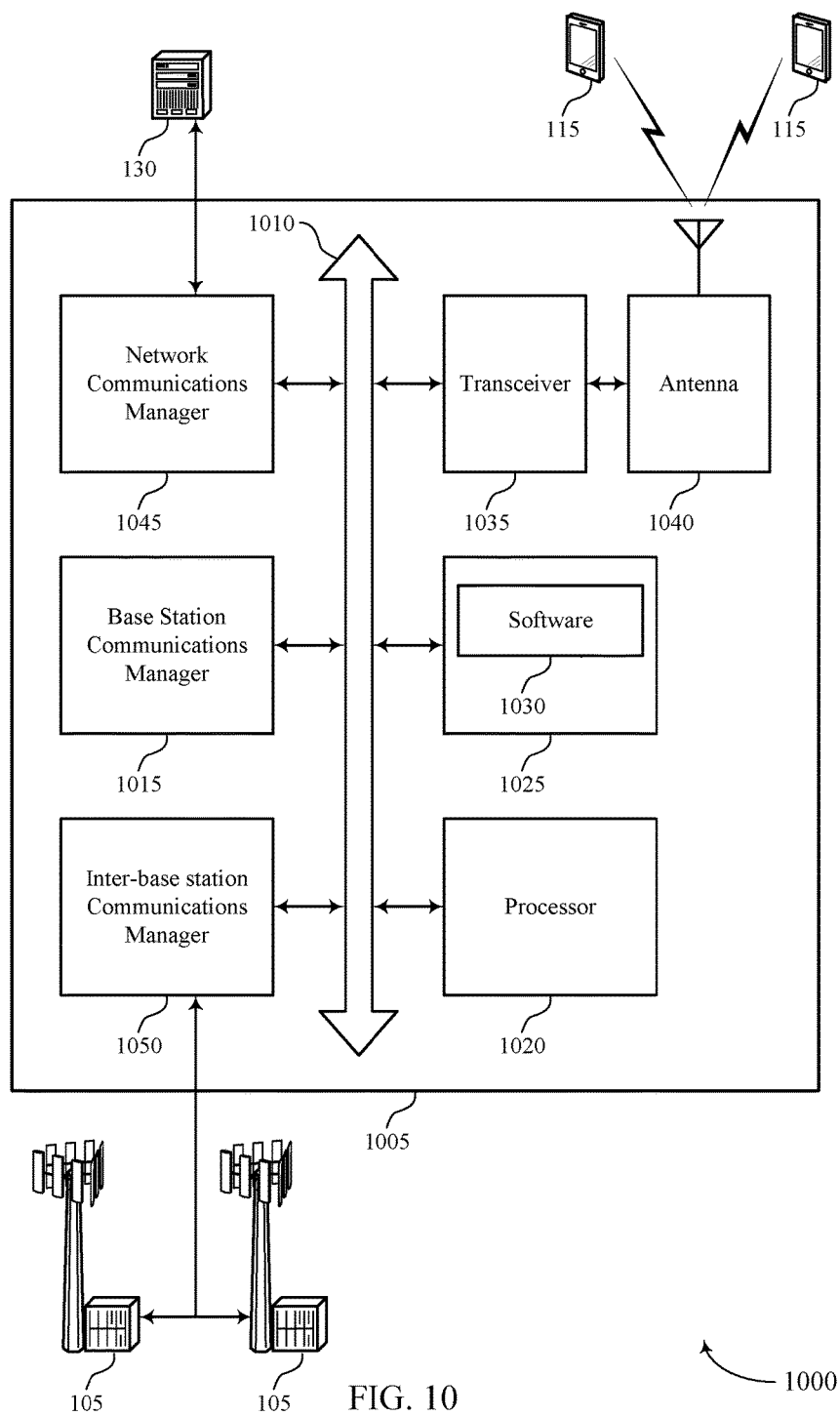
FIG. 10 illustrates a block diagram of a system including a device, such as a base station, that supports a hybrid indication scheme for MBB and low latency communication multiplexing in accordance with various aspects of the present disclosure.

FIG. 10 shows a diagram of a system 1000 including a device 1005 that supports a hybrid indication scheme for MBB and low latency communication multiplexing in accordance with various aspects of the present disclosure. Device 1005 may be an example of or include the components of wireless device 705, wireless device 805, or a base station 105 as described above, e.g., with reference to FIGS. 1, 7 and 8. Device 1005 may include components for bi-directional voice and data communications including components for transmitting and receiving communications, including base station communications manager 1015, processor 1020, memory 1025, software 1030, transceiver 1035, antenna 1040, network communications manager 1045, and inter-base station communications manager 1050. These components may be in electronic communication via one or more busses (e.g., bus 1010). Device 1005 may communicate wirelessly with one or more UEs 115.

Base station communications manager 1015 may manage communications with other base station 105, and may include a controller or scheduler for controlling communications with UEs 115 in cooperation with other base stations 105. For example, the base station communications manager 1015 may coordinate scheduling for transmissions to UEs 115 for various interference mitigation techniques such as beamforming or joint transmission. In some examples, base station communications manager 1015 may provide an X2 interface within an LTE/LTE-A or NR wireless communication network technology to provide communication between base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting a hybrid indication scheme for MBB and low latency communication multiplexing).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware and/or software operation such as the interaction with peripheral components or devices.

Software 1030 may include code to implement aspects of the present disclosure, including code to support a hybrid indication scheme for MBB and low latency communication multiplexing. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

Network communications manager 1045 may manage communications with the core network (e.g., via one or more wired backhaul links). For example, the network communications manager 1045 may manage the transfer of data communications for client devices, such as one or more UEs 115.

Inter-base station communications manager 1050 may manage communications with other base station 105, and may include a controller or scheduler for controlling communications with UEs 115 in cooperation with other base stations 105. For example, the inter-base station communications manager 1050 may coordinate scheduling for transmissions to UEs 115 for various interference mitigation techniques such as beamforming or joint transmission. In some examples, inter-base station communications manager 1050 may provide an X2 interface within an LTE/LTE-A wireless communication network technology to provide communication between base stations 105.

Figure 11:
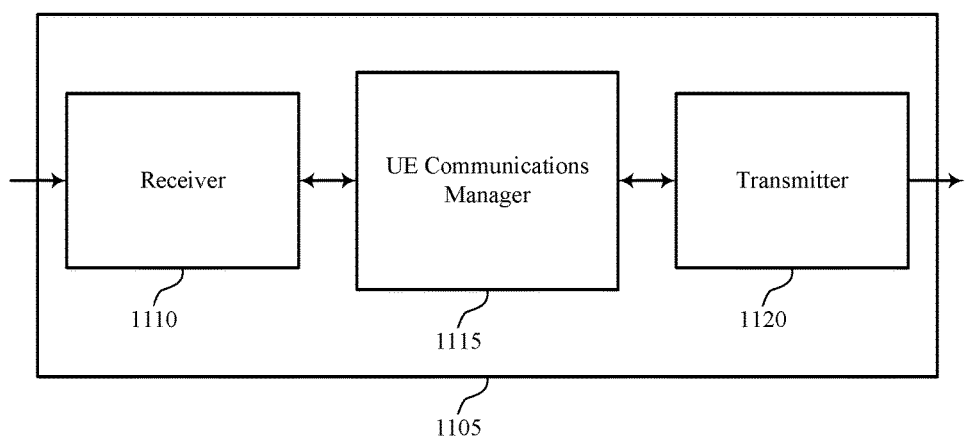
FIGS. 11 through 13 show block diagrams of a device or devices that support a hybrid indication scheme for MBB and low latency communication multiplexing in accordance with various aspects of the present disclosure.

FIG. 11 shows a block diagram 1100 of a wireless device 1105 that supports a hybrid indication scheme for MBB and low latency communication multiplexing in accordance with various aspects of the present disclosure. Wireless device 1105 may be an example of aspects of a UE 115 as described with reference to FIG. 1. Wireless device 1105 may include receiver 1110, UE communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to a hybrid indication scheme for MBB and low latency communication multiplexing, etc.). Information may be passed on to other components of the device. The receiver 1110 may be an example of aspects of the transceiver 1435 described with reference to FIG. 14.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may include a single antenna, or it may include a set of antennas.

UE communications manager 1115 may be an example of aspects of the UE communications manager 1415 described with reference to FIG. 14. UE communications manager 1115 and/or at least some of its various sub-components may be implemented in hardware, software executed by a processor, firmware, or any combination thereof. If implemented in software executed by a processor, the functions of the UE communications manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The UE communications manager 1115 and/or at least some of its various sub-components may be physically located at various positions, including being distributed such that portions of functions are implemented at different physical locations by one or more physical devices. In some examples, UE communications manager 1115 and/or at least some of its various sub-components may be a separate and distinct component in accordance with various aspects of the present disclosure. In other examples, UE communications manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 1115 may receive a first control message indicating first information associated with a resource assignment for a first transmission of a first transmission type associated with a first TTI having a first TTI duration, the first TTI being a subset of a second TTI having a second TTI duration that is greater than the first TTI duration, the first transmission puncturing a second transmission of a second transmission type associated with the second TTI. UE communications manager 1115 may further receive the first transmission over the first TTI and the second transmission over portions of the second TTI that are exclusive of the resource assignment for the first transmission, and receive a second control message subsequent to the first TTI, the second control message indicating second information associated with the resource assignment for the first transmission of the first transmission type. In some cases, the second control message is received in a third TTI subsequent to the second TTI, the third TTI having the second TTI duration. In some cases the second control message is received in a symbol period of the second TTI that is subsequent to the first TTI.

UE communications manager 1115 may coordinate with a receiver 1110 and a transmitter 1120 to communicate based on the first control message and the second control message.

Figure 12:
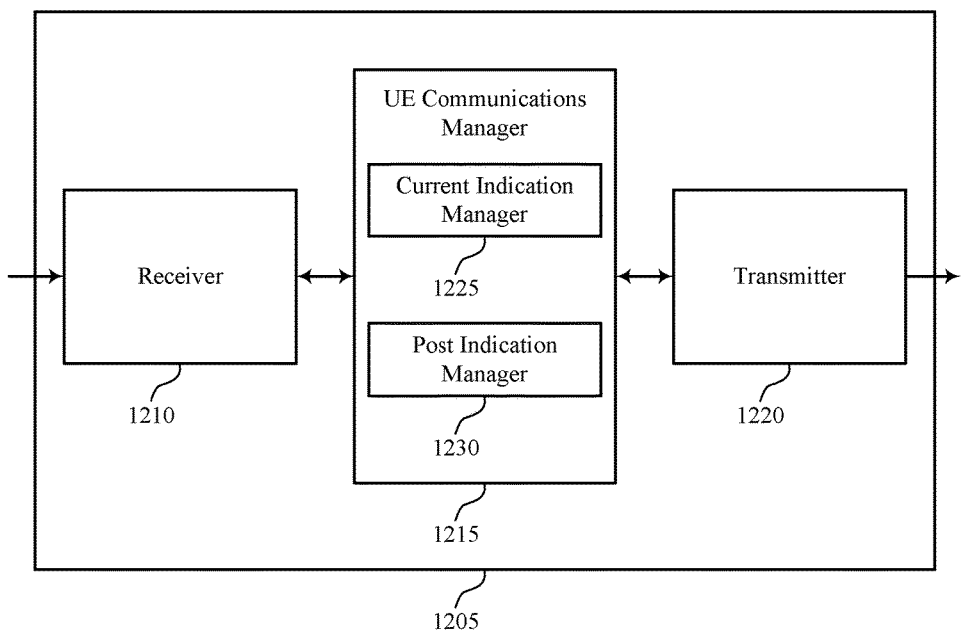

FIG. 12 shows a block diagram 1200 of a wireless device 1205 that supports a hybrid indication scheme for MBB and low latency communication multiplexing in accordance with various aspects of the present disclosure. Wireless device 1205 may be an example of aspects of a wireless device 1105 or a UE 115 as described with reference to FIGS. 1 and 11. Wireless device 1205 may include receiver 1210, UE communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to a hybrid indication scheme for MBB and low latency communication multiplexing, etc.). Information may be passed on to other components of the device. The receiver 1210 may be an example of aspects of the transceiver 1435 described with reference to FIG. 14.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may include a single antenna, or it may include a set of antennas.

UE communications manager 1215 may be an example of aspects of the UE communications manager 1415 described with reference to FIG. 14. UE communications manager 1215 may also include current indication manager 1225 and post indication manager 1230.

Current indication manager 1225 may receive a first control message indicating first information associated with a resource assignment for a first transmission of a first transmission type associated with a first TTI having a first TTI duration, the first TTI being a subset of a second TTI having a second TTI duration that is greater than the first TTI duration, the first transmission puncturing a second transmission of a second transmission type associated with the second TTI. In some cases, the first control message includes a current indicator and the first TTI includes a mini-slot. In some cases, the first control message includes systematic bits.

Post indication manager 1230 may receive a second control message subsequent to the first TTI, the second control message indicating second information associated with the resource assignment for the first transmission of the first transmission type. In some cases, a second control message includes a post indicator and the second TTI includes a slot. In some cases, the second control message indicates power ratio information or modulation order information, or both, for communicating on resources of the second transmission that are not reassigned for the first transmission. In some cases, the second control message is received in a third TTI subsequent to the second TTI, the third TTI having the second TTI duration. In some cases, the second control message is received in a symbol period of the second TTI that is subsequent to the first TTI. In some cases, the second control message includes parity bits.

UE communications manager 1215 may coordinate with a receiver 1210 and a transmitter 1220 to communicate based on the first control message and the second control message. For instance, the receiver 1210 may receive the first transmission over the first TTI and the second transmission over portions of the second TTI that are exclusive of the resource assignment for the first transmission.

Figure 13:
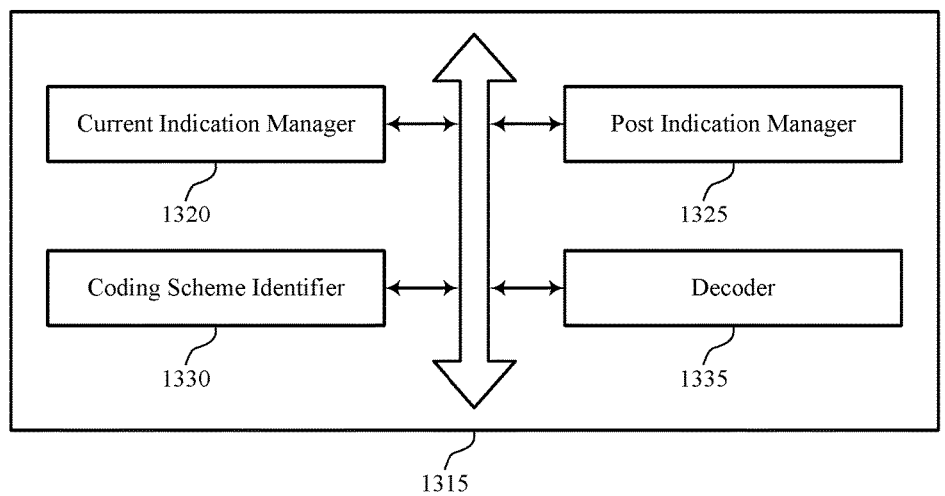

FIG. 13 shows a block diagram 1300 of a UE communications manager 1315 that supports a hybrid indication scheme for MBB and low latency communication multiplexing in accordance with various aspects of the present disclosure. The UE communications manager 1315 may be an example of aspects of a UE communications manager 1415 described with reference to FIGS. 11, 12, and 14. The UE communications manager 1315 may include current indication manager 1320, post indication manager 1325, coding scheme identifier 1330, and decoder 1335. Each of these modules may communicate, directly or indirectly, with one another (e.g., via one or more buses).

Current indication manager 1320 may receive a first control message indicating first information associated with a resource assignment for a first transmission of a first transmission type associated with a first TTI having a first TTI duration, the first TTI being a subset of a second TTI having a second TTI duration that is greater than the first TTI duration, the first transmission puncturing a second transmission of a second transmission type associated with the second TTI. In some cases, the first control message includes a current indicator and the first TTI includes a mini-slot. In some cases, the first control message includes systematic bits.

Post indication manager 1325 may receive a second control message subsequent to the first TTI, the second control message indicating second information associated with the resource assignment for the first transmission of the first transmission type. In some cases, a second control message includes a post indicator and the second TTI includes a slot. In some cases, the second control message indicates power ratio information or modulation order information, or both, for communicating on resources of the second transmission that are not reassigned for the first transmission. In some cases, the second control message is received in a third TTI subsequent to the second TTI, the third TTI having the second TTI duration. In some cases, the second control message is received in a symbol period of the second TTI that is subsequent to the first TTI. In some cases, the second control message includes parity bits.

Coding scheme identifier 1330 may identify a coding scheme for the first control message and the second control message. Decoder 1335 may decode the first control message and the second control message based on the identified coding scheme. In some cases, the coding scheme includes a FEC code. In some cases, the FEC code includes a polar code, turbo code, or a convolutional code.

Figure 14:
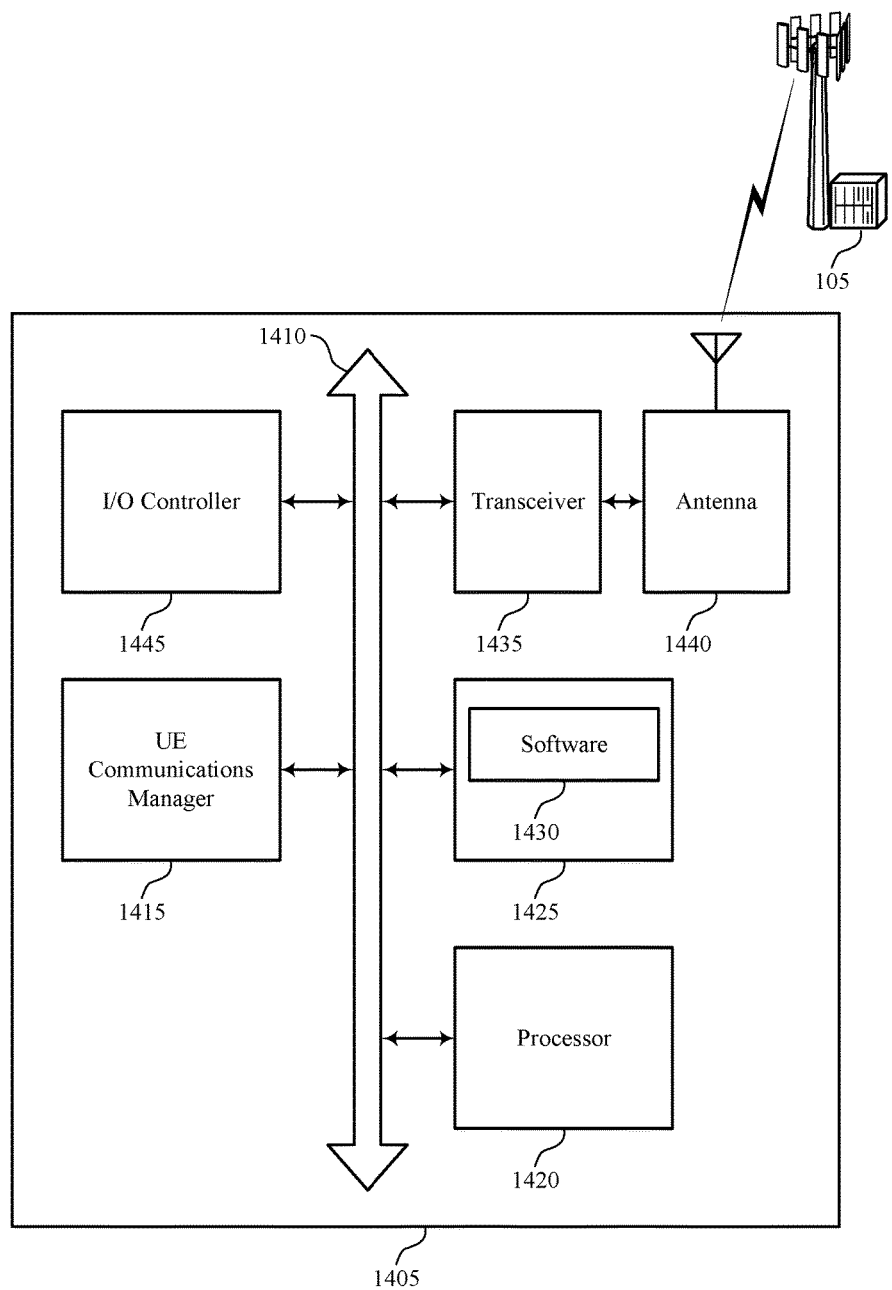
FIG. 14 illustrates a block diagram of a system including a device that supports a hybrid indication scheme for MBB and low latency communication multiplexing in accordance with various aspects of the present disclosure.

FIG. 14 shows a diagram of a system 1400 including a device 1405 that supports a hybrid indication scheme for MBB and low latency communication multiplexing in accordance with various aspects of the present disclosure. Device 1405 may be an example of or include the components of UE 115 as described above, e.g., with reference to FIG. 1. Device 1405 may include components for bi-directional voice and data communications including components for transmitting and receiving communications, including UE communications manager 1415, processor 1420, memory 1425, software 1430, transceiver 1435, antenna 1440, and I/O controller 1445. These components may be in electronic communication via one or more busses (e.g., bus 1410). Device 1405 may communicate wirelessly with one or more base stations 105.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting a hybrid indication scheme for MBB and low latency communication multiplexing).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware and/or software operation such as the interaction with peripheral components or devices.

Software 1430 may include code to implement aspects of the present disclosure, including code to support a hybrid indication scheme for MBB and low latency communication multiplexing. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

I/O controller 1445 may manage input and output signals for device 1405. I/O controller 1445 may also manage peripherals not integrated into device 1405. In some cases, I/O controller 1445 may represent a physical connection or port to an external peripheral. In some cases, I/O controller 1445 may utilize an operating system such as iOS®, ANDROID®, MS-DOS®, MS-WINDOWS®, OS/2®, UNIX®, LINUX®, or another known operating system. In other cases, I/O controller 1445 may represent or interact with a modem, a keyboard, a mouse, a touchscreen, or a similar device. In some cases, I/O controller 1445 may be implemented as part of a processor. In some cases, a user may interact with device 1405 via I/O controller 1445 or via hardware components controlled by I/O controller 1445.

Figure 15:
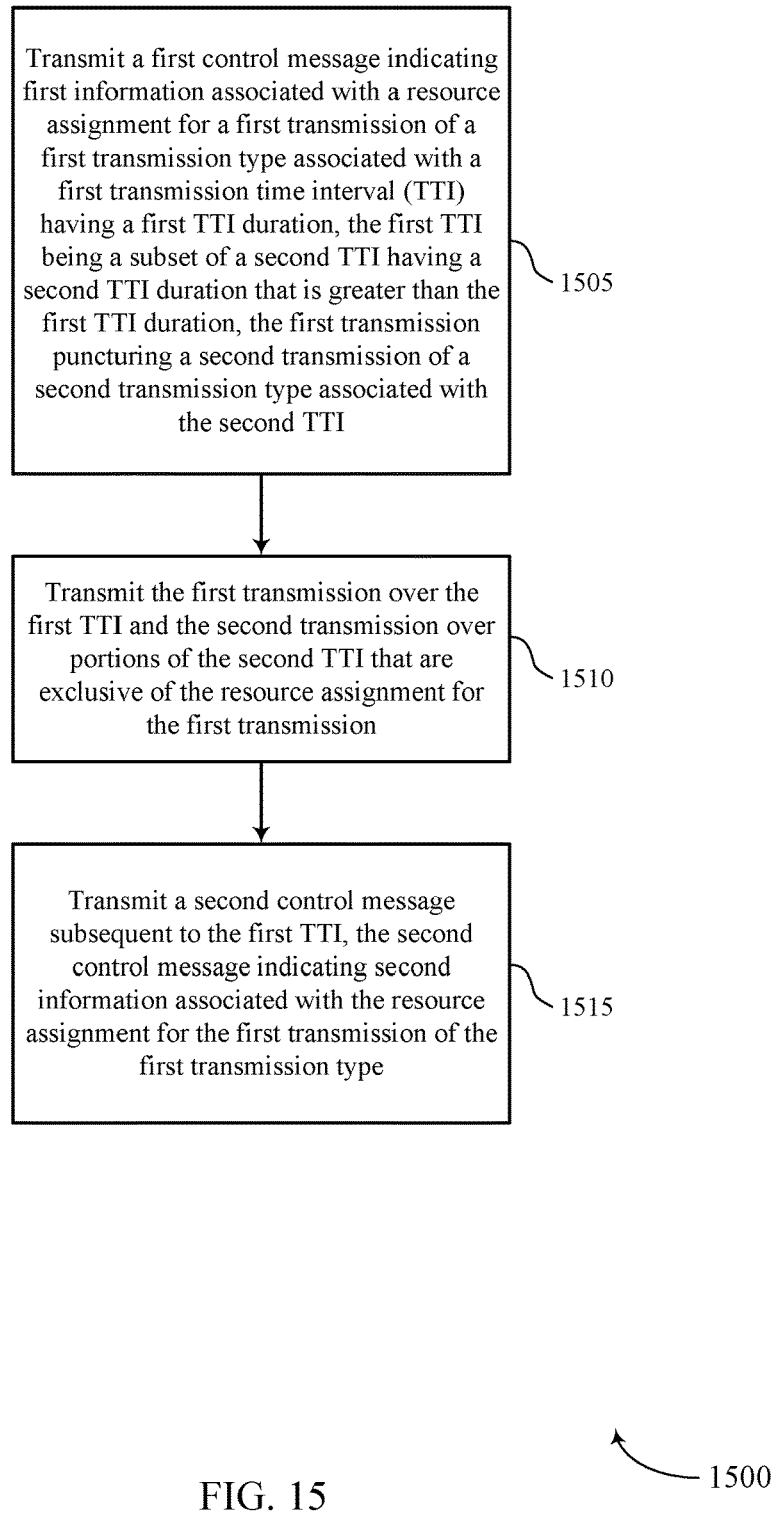
FIGS. 15 through 16 illustrate methods for a hybrid indication scheme for MBB and low latency communication multiplexing in accordance with various aspects of the present disclosure.

FIG. 15 shows a flowchart illustrating a method 1500 for a hybrid indication scheme for MBB and low latency communication multiplexing in accordance with various aspects of the present disclosure. The operations of method 1500 may be implemented by a base station 105 or its components as described herein. For example, the operations of method 1500 may be performed by a base station communications manager as described with reference to FIGS. 7 through 10. In some examples, a base station 105 may execute a set of codes to control the functional elements of the device to perform the functions described below. Additionally or alternatively, the base station 105 may perform aspects of the functions described below using special-purpose hardware.

At block 1505, the base station 105 may transmit a first control message indicating first information associated with a resource assignment for a first transmission of a first transmission type associated with a first TTI having a first TTI duration, the first TTI being a subset of a second TTI having a second TTI duration that is greater than the first TTI duration, the first transmission puncturing a second transmission of a second transmission type associated with the second TTI. The operations of block 1505 may be performed according to the methods described with reference to FIGS. 1 through 5. In certain examples, aspects of the operations of block 1505 may be performed by a current indication manager as described with reference to FIGS. 7 through 10.

At block 1510, the base station 105 may transmit the first transmission over the first TTI and the second transmission over portions of the second TTI that are exclusive of the resource assignment for the first transmission. The operations of block 1510 may be performed according to the methods described with reference to FIGS. 1 through 5. In certain examples, aspects of the operations of block 1515 may be performed by a transmitter as described with reference to FIGS. 7 through 10.

At block 1515, the base station 105 may transmit a second control message subsequent to the first TTI, the second control message indicating second information associated with the resource assignment for the first transmission of the first transmission type. In some cases, the second control message includes a post-indicator, and may be transmitted at the end of the second TTI or in a third TTI of the second duration that is subsequent to the second TTI. In some cases, the second control message indicates power ratio information or modulation order information, or both, for resources of the second transmission of the second transmission type that are exclusive of the reassigned resources of the first TTI. The operations of block 1515 may be performed according to the methods described with reference to FIGS. 1 through 5. In certain examples, aspects of the operations of block 1510 may be performed by a post indication manager as described with reference to FIGS. 7 through 10.

Figure 16:
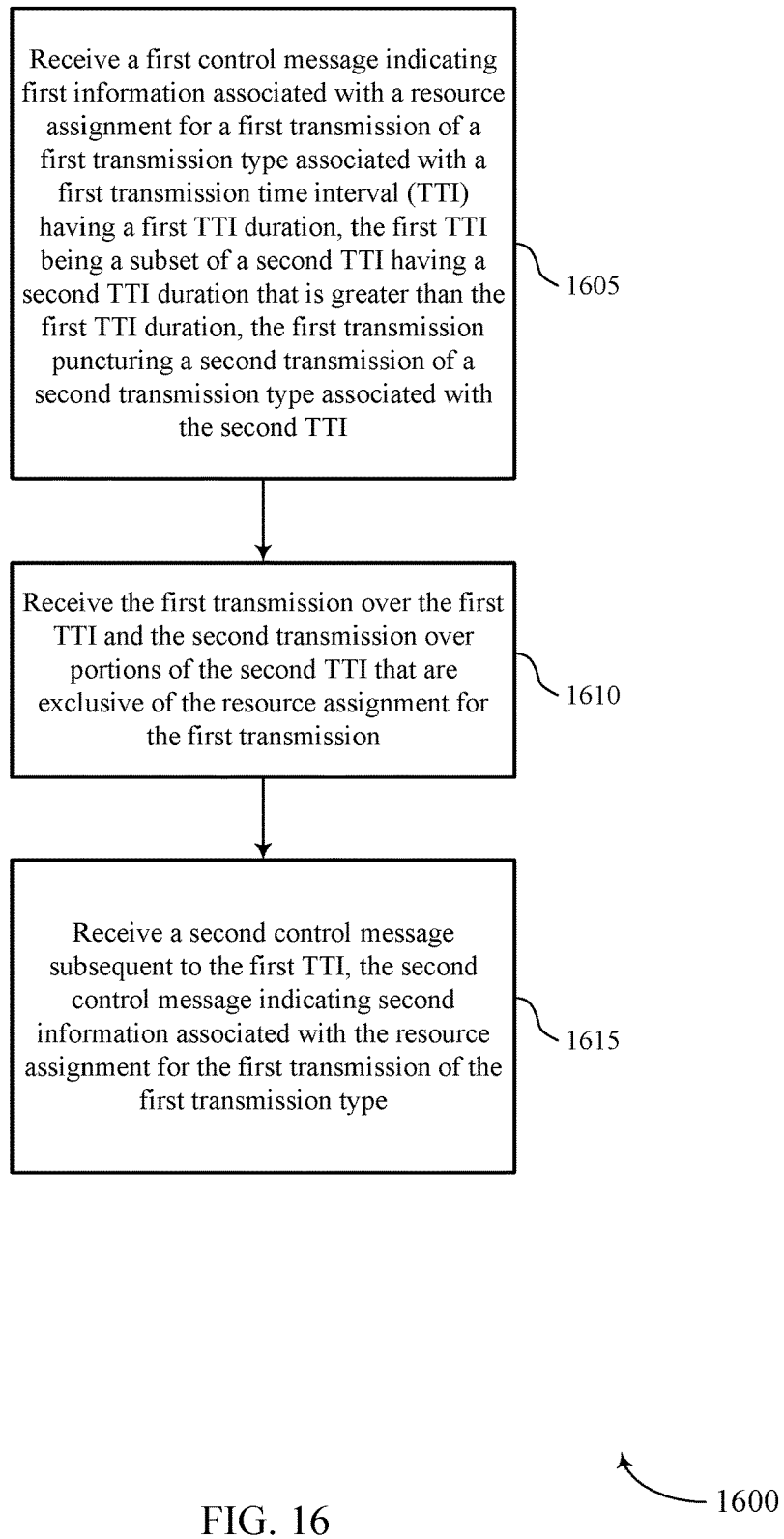

FIG. 16 shows a flowchart illustrating a method 1600 for a hybrid indication scheme for MBB and low latency communication multiplexing in accordance with various aspects of the present disclosure. The operations of method 1600 may be implemented by a UE 115 or its components as described herein. For example, the operations of method 1600 may be performed by a UE communications manager as described with reference to FIGS. 11 through 14. In some examples, a UE 115 may execute a set of codes to control the functional elements of the device to perform the functions described below. Additionally or alternatively, the UE 115 may perform aspects of the functions described below using special-purpose hardware.

At block 1605, the UE 115 may receive a first control message indicating first information associated with a resource assignment for a first transmission of a first transmission type associated with a first TTI having a first TTI duration, the first TTI being a subset of a second TTI having a second TTI duration that is greater than the first TTI duration, the first transmission puncturing a second transmission of a second transmission type associated with the second TTI. The operations of block 1605 may be performed according to the methods described with reference to FIGS. 1 through 5. In certain examples, aspects of the operations of block 1605 may be performed by a current indication manager as described with reference to FIGS. 11 through 14.

At block 1610, the UE 115 may receive the first transmission over the first TTI and the second transmission over portions of the second TTI that are exclusive of the resource assignment for the first transmission. The operations of block 1610 may be performed according to the methods described with reference to FIGS. 1 through 5. In certain examples, aspects of the operations of block 1610 may be performed by a transmitter as described with reference to FIGS. 11 through 14.

At block 1615, the UE 115 may receive a second control message subsequent to the first TTI, the second control message indicating second information associated with the resource assignment for the first transmission of the first transmission type. In some cases, the second control message indicates power ratio information or modulation order information, or both, for communicating on resources of the second transmission that are not reassigned for the first transmission. In some cases, the second control message is received in a third TTI subsequent to the second TTI, the third TTI having the second TTI duration. In some cases, the second control message is received in a symbol period of the second TTI that is subsequent to the first TTI. The operations of block 1615 may be performed according to the methods described with reference to FIGS. 1 through 5. In certain examples, aspects of the operations of block 1615 may be performed by a post indication manager as described with reference to FIGS. 11 through 14.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," "component," and the like may not be a substitute for the word "means." As such, no claim element is to be construed as a means plus function unless the element is expressly recited using the phrase "means for."

What is claimed is:

1. A method for wireless communication, comprising:
    allocating resources for a first transmission of a first transmission type associated with a first transmission time interval (TTI) having a first TTI duration;
    transmitting a first control message indicating first information associated with reassigning resources of the allocated resources for a second transmission of a second transmission type associated with a second TTI having a second TTI duration, the second TTI being a subset of the first TTI, the second TTI duration being shorter than the first TTI duration, and the second transmission puncturing the first transmission, wherein the first control message is transmitted over a first portion of the second TTI and the first information comprises a flag associated with the reassigned resources for the second transmission;
    transmitting the second transmission over the second TTI and the first transmission over portions of the first TTI that are exclusive of the reassigned resources for the second transmission; and
    transmitting a second control message subsequent to the second TTI, the second control message indicating second information associated with the reassigned resources for the second transmission of the second transmission type, wherein the second information is different from the first information and comprises at least an indication of the reassigned resources for the second transmission of the second transmission type.

2. The method of claim 1, wherein transmitting the second control message comprises transmitting the second control message in a third TTI subsequent to the first TTI, the third TTI having the first TTI duration.

3. The method of claim 1, wherein transmitting the second control message comprises transmitting the second control message in a symbol period of the first TTI that is subsequent to the second TTI.

4. The method of claim 1, wherein the first control message comprises systematic bits and the second control message comprises parity bits.

5. The method of claim 1, wherein the second control message indicates power ratio information or modulation order information, or both, for resources of the first transmission that are within the second TTI.

6. The method of claim 1, further comprising:
encoding a control message indicating the reassigned resources using a forward error correction (FEC) code to obtain a set of encoded bits;
transmitting a first subset of the set of encoded bits as the first control message; and
transmitting a second subset of the set of encoded bits as the second control message, wherein the second control message comprises redundancy bits of the set of encoded bits.

7. The method of claim 6, wherein the FEC code comprises a polar code, a turbo code, or a convolutional code.

8. The method of claim 1, further comprising:
communicating with a user equipment (UE) operating in an ultra-reliable low latency mode on the reassigned resources for the second transmission of the second transmission type during the second TTI having the second TTI duration.

9. The method of claim 1, further comprising:
communicating with a user equipment (UE) operating in a mobile broadband (MBB) mode on resources of the first TTI that are exclusive of the reassigned resources for the second transmission.

10. A method for wireless communication, comprising:
receiving allocated resources for a first transmission of a first transmission type associated with a first transmission time interval (TTI) having a first TTI duration;
receiving a first control message indicating first information associated with reassigning resources of the allocated resources for a second transmission of a second transmission type associated with a second TTI having a second TTI duration, the second TTI being a subset of the first TTI, the second TTI duration being shorter than the first TTI duration, and the second transmission puncturing the first transmission, wherein the first control message is received over a first portion of the second TTI and the first information comprises a flag associated with the reassigned resources for the second transmission;
receiving the first transmission over portions of the first TTI that are exclusive of the reassigned resources for the second transmission; and
receiving a second control message subsequent to the second TTI, the second control message indicating second information associated with the reassigned resources for the second transmission of the second transmission type, wherein the second information is different from the first information and comprises at least an indication of the reassigned resources for the second transmission of the second transmission type.

11. The method of claim 10, wherein receiving the second control message comprises receiving the second control message in a third TTI subsequent to the first TTI, the third TTI having the first TTI duration.

12. The method of claim 10, wherein receiving the second control message comprises receiving the second control message in a symbol period of the first TTI that is subsequent to the second TTI.

13. The method of claim 10, wherein the first control message comprises systematic bits and the second control message comprises parity bits.

14. The method of claim 10, wherein the second control message indicates power ratio information or modulation order information, or both, for communicating on the reassigned resources for the second transmission of the second transmission type.

15. The method of claim 10, further comprising:
identifying a coding scheme for the first control message and the second control message; and
decoding the first control message and the second control message based at least in part on the identified coding scheme.

16. The method of claim 15, further comprising:
using both the decoded first control message and the decoded second control message to identify the portions of the first TTI that are exclusive of the reassigned resources for the second transmission.

17. An apparatus for wireless communication, comprising:
a processor;
memory in electronic communication with the processor; and
instructions stored in the memory and operable, when executed by the processor, to cause the apparatus to:
allocate resources for a first transmission of a first transmission type associated with a first transmission time interval (TTI) having a first TTI duration;
transmit a first control message indicating first information associated with reassigning resources of the allocated resources for a second transmission of a second transmission type associated with a second TTI having a second TTI duration, the second TTI being a subset of the first TTI, the second TTI duration being shorter than the first TTI duration, and the second transmission puncturing the first transmission, wherein the first control message is transmitted over a first portion of the second TTI and the first information comprises a flag associated with the reassigned resources for the second transmission;
transmit the second transmission over the second TTI and the first transmission over portions of the first TTI that are exclusive of the reassigned resources for the second transmission; and
transmit a second control message subsequent to the second TTI, the second control message indicating second information associated with the reassigned resources for the second transmission of the second transmission type, wherein the second information is different from the first information and comprises at least an indication of the reassigned resources for the second transmission of the second transmission type.

18. The apparatus of claim 11, wherein the instructions are further executable by the processor to:
transmit the second control message in a third TTI subsequent to the first TTI, the third TTI having the first TTI duration.

19. The apparatus of claim 11, wherein the instructions are further executable by the processor to:
transmit the second control message in a symbol period of the first TTI that is subsequent to the second TTI.

20. The apparatus of claim 11, wherein the second control message indicates power ratio information or modulation order information, or both, for resources of the first transmission that are within the second TTI.

21. The apparatus of claim 11, wherein the instructions are further executable by the processor to:
   encode a control message indicating the reassigned resources using a forward error correction (FEC) code to obtain a set of encoded bits;
   transmit a first subset of the set of encoded bits as the first control message; and
   transmit a second subset of the set of encoded bits as the second control message, wherein the second control message comprises redundancy bits of the set of encoded bits.

22. The apparatus of claim 21, wherein the FEC code comprises a polar code, a turbo code, or a convolutional code.

23. The apparatus of claim 11, wherein the instructions are further executable by the processor to:
   communicate with a user equipment (UE) operating in an ultra-reliable low latency mode on the reassigned resources for the second transmission of the second transmission type during the second TTI having the second TTI duration.

24. The apparatus of claim 11, wherein the instructions are further executable by the processor to:
   communicate with a user equipment (UE) operating in a mobile broadband (MBB) mode on resources of the first TTI that are exclusive of the reassigned resources for the second transmission.

25. An apparatus for wireless communication, comprising:
   a processor;
   memory in electronic communication with the processor; and
   instructions stored in the memory and operable, when executed by the processor, to cause the apparatus to:
      receive allocated resources for a first transmission of a first transmission type associated with a first transmission time interval (TTI) having a first TTI duration;
      receive a first control message indicating first information associated with reassigning resources of the allocated resources for a second transmission of a second transmission type associated with a second TTI having a second TTI duration, the second TTI being a subset of the first TTI, the second TTI duration being shorter than the first TTI duration, and the second transmission puncturing the first transmission, wherein the first control message is received over a first portion of the second TTI and the first information comprises a flag associated with the reassigned resources for the second transmission;
      receive the first transmission over portions of the first TTI that are exclusive of the reassigned resources for the second transmission; and
      receive a second control message subsequent to the second TTI, the second control message indicating second information associated with the reassigned resources for the second transmission of the second transmission type, wherein the second information is different from the first information and comprises at least an indication of the reassigned resources for the second transmission of the second transmission type.

26. The apparatus of claim 25, wherein the instructions are further executable by the processor to:
   receive the second control message in a third TTI subsequent to the first TTI, the third TTI having the first TTI duration.

27. The apparatus of claim 25, wherein the instructions are further executable by the processor to:
   receive the second control message in a symbol period of the first TTI that is subsequent to the second TTI.

* * * * *